(12) United States Patent
Dougherty et al.

(10) Patent No.: US 11,325,606 B2
(45) Date of Patent: May 10, 2022

(54) METHODS AND SYSTEMS FOR ESTABLISHING COOPERATIVE DRIVING ENGAGEMENTS WITH VEHICLES HAVING VARYING LEVELS OF AUTONOMY

(71) Applicant: QUALCOMM Incorporated, San Diego, CA (US)

(72) Inventors: John Anthony Dougherty, Philadelphia, PA (US); Jordan Scott Burklund, West Des Moines, IA (US); Kristen Wagner Cerase, Newark, DE (US); Stephen Marc Chaves, Philadelphia, PA (US); Ross Eric Kessler, Philadelphia, PA (US); Paul Daniel Martin, Devon, PA (US); Daniel Warren Mellinger, III, Philadelphia, PA (US); Michael Joshua Shomin, Philadelphia, PA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 16/727,204

(22) Filed: Dec. 26, 2019

(65) Prior Publication Data
US 2020/0207371 A1    Jul. 2, 2020

Related U.S. Application Data

(60) Provisional application No. 62/787,569, filed on Jan. 2, 2019, provisional application No. 62/787,560, filed on Jan. 2, 2019.

(51) Int. Cl.
*B60W 60/00*    (2020.01)
*G05D 1/02*    (2020.01)
(Continued)

(52) U.S. Cl.
CPC .......... *B60W 40/09* (2013.01); *B60W 30/162* (2013.01); *B60W 40/02* (2013.01);
(Continued)

(58) Field of Classification Search
CPC ............. B60W 40/09; B60W 60/0017; B60W 60/00186; B60W 30/162; B60W 40/02;
(Continued)

(56) References Cited

U.S. PATENT DOCUMENTS 10,380,898 B1 *   8/2019  Schubert ................. G08G 1/22
2010/0256852 A1  10/2010  Mudalige
(Continued)

FOREIGN PATENT DOCUMENTS

EP          2881926 A1      6/2015
WO       2017147007 A1      8/2017
WO    WO-2017147007 A1 *    8/2017  ............... G08G 1/22

OTHER PUBLICATIONS

International Search Report and Written Opinion—PCT/US2019/068677—ISA/EPO—dated Apr. 8, 2020. 13 pages.
(Continued)

*Primary Examiner* — Fadey S. Jabr
*Assistant Examiner* — Naeem Taslim Alam
(74) *Attorney, Agent, or Firm* — The Marbury Law Group, PLLC

(57) ABSTRACT

Methods, devices and systems enable controlling an autonomous vehicle by identifying vehicles that are within a threshold distance of the autonomous vehicle, determining an autonomous capability metric of each of the identified vehicles, and adjusting a driving parameter of the autonomous vehicle based on the determined autonomous capability metric of each of the identified vehicles. Embodiments may further include determining, based on the determined ACMs, whether one or more identified vehicles would
(Continued)

provide an operational advantage to the autonomous vehicle in a cooperative driving engagement, and initiating a cooperative driving engagement with the one or more identified vehicles in response to determining that the one or more identified vehicles would provide an operational advantage to the autonomous vehicle in a cooperative driving engagement.

29 Claims, 18 Drawing Sheets

(51) Int. Cl.
  *G05D 1/00* (2006.01)
  *B60W 40/02* (2006.01)
  *B60W 40/09* (2012.01)
  *B60W 30/16* (2020.01)
  *B60W 50/00* (2006.01)
  *H04W 4/46* (2018.01)
  *G06V 20/58* (2022.01)

(52) U.S. Cl.
  CPC .... *B60W 50/0097* (2013.01); *B60W 60/0017* (2020.02); *B60W 60/00186* (2020.02); *G05D 1/0066* (2013.01); *G05D 1/0088* (2013.01); *G05D 1/0223* (2013.01); *G05D 1/0293* (2013.01); *G06V 20/584* (2022.01); *H04W 4/46* (2018.02); *B60W 2050/0075* (2013.01); *B60W 2556/65* (2020.02); *G05D 2201/0213* (2013.01)

(58) Field of Classification Search
  CPC ......... B60W 50/0097; B60W 2556/65; B60W 2050/0075; H04W 4/46; G05D 1/0066; G05D 1/0088; G05D 1/0223; G05D 1/0293; G05D 2201/0213; G06K 9/00825
  See application file for complete search history.

(56) References Cited

U.S. PATENT DOCUMENTS

| | | | |
|---|---|---|---|
| 2015/0160653 A1 | 6/2015 | Cheatham, III et al. | |
| 2015/0170287 A1 | 6/2015 | Tirone et al. | |
| 2016/0171894 A1* | 6/2016 | Harvey | G05D 1/0293 |
| | | | 701/23 |
| 2017/0050638 A1 | 2/2017 | Gordon et al. | |
| 2017/0253241 A1 | 9/2017 | Filev et al. | |
| 2018/0039283 A1 | 2/2018 | Srivastava et al. | |
| 2018/0141562 A1 | 5/2018 | Singhal et al. | |
| 2018/0307245 A1 | 10/2018 | Khawaja et al. | |
| 2019/0035284 A1* | 1/2019 | Tam | G05D 1/0297 |
| 2019/0051159 A1* | 2/2019 | Wang | G05D 1/0027 |
| 2019/0179312 A1* | 6/2019 | Kong | G05D 1/0246 |
| 2019/0220037 A1* | 7/2019 | Vladimerou | G05D 1/0088 |
| 2019/0332104 A1* | 10/2019 | Woodrow | G08G 1/207 |
| 2020/0004270 A1* | 1/2020 | Harvey | G05D 1/0297 |
| 2020/0074862 A1* | 3/2020 | Johnston | G05D 1/0088 |
| 2020/0105131 A1 | 4/2020 | Carter et al. | |
| 2020/0207360 A1 | 7/2020 | Dougherty et al. | |

OTHER PUBLICATIONS

Hobert L., et al., "Enhancements of V2X Communication in Support of Cooperative Autonomous Driving", IEEE Communications Magazine, Dec. 2015, pp. 64-70.

\* cited by examiner

METHODS AND SYSTEMS FOR ESTABLISHING COOPERATIVE DRIVING ENGAGEMENTS WITH VEHICLES HAVING VARYING LEVELS OF AUTONOMY

RELATED APPLICATIONS

This application claims the benefit of priority to U.S. Provisional Application No. 62/787,569, entitled "Methods And Systems For Establishing Cooperative Driving Engagements With Vehicles Having Varying Levels Of Autonomy" filed Jan. 2, 2019, and U.S. Provisional Application No. 62/787,560, entitled "Methods And Systems For Managing Interactions Between Vehicles With Varying Levels Of Autonomy" filed Jan. 2, 2019, the entire contents of both of which are hereby incorporated by reference for all purposes.

BACKGROUND

Automobiles are becoming more intelligent as the industry moves towards deploying increasingly sophisticated self-driving technologies that are capable of operating a vehicle with little or no human input. These autonomous and semi-autonomous vehicles can detect information about their location and surroundings (for example, using radar, LIDAR, GPS, odometers, accelerometers, cameras, and other sensors), and typically include control systems that interpret sensory information to identify hazards and determine navigation paths to follow.

Concurrent with these trends, new and emerging cellular and wireless communication technologies, such as 5G New Radio (5G NR), have begun offer a wide array of new features and services, which has encouraged the surface transportation industry to develop intelligent transportation systems (ITS) that utilize vehicle-based communications for safer and more efficient use of motor vehicles and transportation resources. Autonomous vehicles may use such vehicle-based communications to collaborate and operate in ways that are not safe (or even possible) when a human is in control of the vehicle. For example, autonomous vehicles may use vehicle-based communications to form a caravan, and drive much faster and closer to one another to increase traffic throughput.

SUMMARY

The various embodiments include methods of controlling an autonomous vehicle, which may include identifying, via a processor of the autonomous vehicle, vehicles that are within a threshold distance of the autonomous vehicle, determining an autonomous capability metric (ACM) for the identified vehicles, determining, based on the determined ACMs, whether one or more identified vehicles would provide an operational advantage to the autonomous vehicle in a cooperative driving engagement, and initiating a cooperative driving engagement with the one or more identified vehicles in response to determining that the one or more identified vehicles would provide an operational advantage to the autonomous vehicle in a cooperative driving engagement.

In an embodiment, initiating the cooperative driving engagement with the one or more identified vehicles in response to determining that the one or more identified vehicles would provide an operational advantage to the autonomous vehicle in a cooperative driving engagement may include determining whether the one or more identified vehicles will be traveling in a same or similar direction as the autonomous vehicle for a threshold period of time in response to determining that one or more identified vehicles would provide an operational advantage to the autonomous vehicle in a cooperative driving engagement, and initiating the cooperative driving engagement with the one or more identified vehicles in response to determining that the one or more identified vehicles will be traveling in a same or similar direction as the autonomous vehicle for the threshold period of time.

In a further embodiment, determining whether the one or more identified vehicles will be traveling in a same or similar direction as the autonomous vehicle for a threshold period of time may include communicating with the one or more identified vehicles to determine a destination or planned travel route of the one or more identified vehicle, comparing the destination or planned travel route of the one or more identified vehicles to a destination of the autonomous vehicle, determining a duration that the one or more identified vehicles will be traveling along a route consistent with the destination of the autonomous vehicle, and comparing the determined duration to the threshold period of time.

In a further embodiment, initiating a cooperative driving engagement with the one or more identified vehicles may further include sending a communication message to the one or more identified vehicles to request that the one or more identified vehicles participate in the cooperative driving engagement, receiving a confirmation message indicating the one or more identified vehicles will participate in the cooperative driving engagement, establishing direct communication links to the one or more identified vehicles in response to receiving the confirmation message indicating the one or more identified vehicles will participate in the cooperative driving engagement, receiving information from the one or more identified vehicles via the direct communication links, and adjusting a driving parameter of the autonomous vehicle based on the information received from the one or more identified vehicles.

In a further embodiment, determining, based on the determined ACMs, whether one or more identified vehicles would provide an operational advantage to the autonomous vehicle in a cooperative driving engagement may include determining whether one or more sensors of the one or more identified vehicles would provide a sensor capability not possessed by the autonomous vehicle that would be beneficial for safety or operational performance of the autonomous vehicle. In a further embodiment, determining, based on the determined ACMs, whether one or more identified vehicles would provide an operational advantage to the autonomous vehicle in a cooperative driving engagement may include determining whether a level of autonomy of the one or more identified vehicles would enable the autonomous vehicle to operate more safely or with improved performance in the cooperative driving engagement.

In a further embodiment, determining, based on the determined ACMs, whether one or more identified vehicles would provide an operational advantage to the autonomous vehicle in a cooperative driving engagement takes into consideration a driving condition including at least one of a roadway condition, a weather condition, a type of roadway, a level of vehicle traffic on the roadway, a speed limit of the roadway, a hazard or obstacle along the roadway, or a lighting condition. In a further embodiment, the cooperative driving engagement may include operating the autonomous vehicle in a caravan with the one or more identified vehicles. In a further embodiment, the cooperative driving engagement may include sending information to and receiving information from the one or more identified vehicles. In a further embodiment, determining an autonomous capability metric (ACM) for the identified vehicles may include generating vector or matrix of values that collectively identify or predict a level of autonomy or a performance capability of the identified vehicles.

Further aspects may include a vehicle having a processor configured with processor-executable instructions to perform various operations of any of the methods summarized above. Further aspects may include a processor for use in a vehicle in which the processor is configured with processor-executable instructions to perform various operations of any of the methods summarized above. Further aspects may include a vehicle having various means for performing functions of any of the methods summarized above. Further aspects may include a non-transitory processor-readable storage medium having stored thereon processor-executable instructions configured to cause a processor in a vehicle to perform operations of any of the methods summarized above.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

DETAILED DESCRIPTION

Figure 1A:
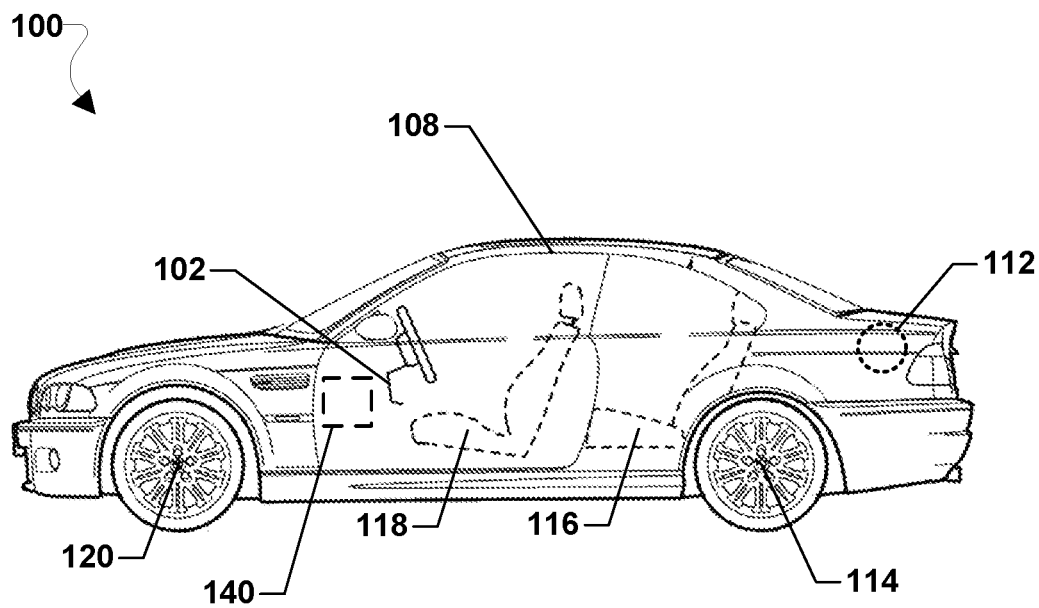
FIGS. 1A and 1B are component block diagrams illustrating a vehicle suitable for implementing various embodiments.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In order for the autonomous vehicles to work together effectively, each autonomous vehicle may take into consideration the varying levels of capability and autonomy of surrounding vehicles that are effective at each instant. In addition, autonomous vehicles may adapt to dynamic factors that could alter the behavior of surrounding vehicles, but which can only be known by observing and analyzing a vehicle while it is in operation. Improved vehicle-based communications and automotive control systems that allow autonomous vehicles to better identify, analyze, interpret, and respond to the dynamic behaviors and capabilities of surrounding vehicles will enhance traffic efficiency and safety.

In overview, various embodiments include vehicles equipped with a vehicle autonomous driving system (VADS) that uses information collected from the vehicle's sensors (e.g., camera, radar, LIDAR, etc.) in conjunction with information received via V2V communications from one or more surrounding vehicles to determine an autonomous capability metric (ACM) for one or more nearby vehicles (e.g., car in front, behind, left side, right side, etc.). The ACM may include one or more discrete values or a continuum of values that collectively identify, estimate, or predict a level of autonomy and/or various performance capabilities of the nearby vehicle. In some embodiments, the ACM may be a single number or category summarizing the overall level of autonomy and/or performance characteristics of the vehicle. In some embodiments, the ACM may be a vector or matrix of values with each value in the ACM representing a different aspect of a predicted, collected or observed feature, factor or data point associated with the nearby vehicle. In some embodiments, the ACM may be formatted in a map, matrix or vector data structure that characterizes or represents the nearby vehicle, and which may be compared to thresholds and/or applied to a classifier model or decision nodes to generate an analysis result suitable for interpreting the collection of discrete/continuum values.

In various embodiments, the VADS component may generate and use the ACMs to adjust various driving parameters of the autonomous vehicle (i.e., own driving behavior), such as speed, minimum separation distance, lane changing rules, minimum following distance, acceleration rate at which the autonomous vehicle will change speed, etc. For example, if the ACM indicates that the vehicle immediately in front of the autonomous vehicle is being manually operated by a human driver, the VADS component may adjust its following distance driving parameter for that vehicle to account for the reaction time of the human driver. As another example, if the ACM indicates that a vehicle behind is in need of new brake pads, the VADS component may adjust its minimum separation distance driving parameter for that vehicle to account for the longer stopping distance that could result from worn-down brake pads.

In some embodiments, the VADS component may be configured to identify all vehicles that are within a threshold distance (e.g., 10 feet, 20 feet, etc.) from the autonomous vehicle, receive or determine an ACM for each of the identified vehicles, and adjust its driving parameters based on the received/determined ACMs. For example, the VADS component may adjust the autonomous vehicle's minimum following distance, speed, or acceleration rate at which the autonomous vehicle will change speed, based on the ACM (e.g., level of autonomy, etc.) of the vehicle that is immediately in front of the autonomous vehicle. As another example, the VADS component may adjust the minimum separation distances that the VADS will maintain between the autonomous vehicle and each surrounding vehicle based on the respective ACMs of the surrounding vehicles. In some embodiments, the threshold distance may be determined dynamically and/or adjusted based on the detected conditions. For example, the threshold distance may be a function of vehicle speed (e.g., on highways the threshold distance may be much larger than on low speed roads, etc.), road conditions, weather, or any other factor discussed in this application.

In some embodiments, the VADS in an autonomous vehicle may be configured to seek out, identify vehicles with complementary sensor capability, and form a caravan of vehicles (e.g., with one other vehicle) based on the capabilities of the one or more identified vehicles to increase the efficiency, safety, permissible speed, and/or level of autonomy of the autonomous vehicle. That is, since different vehicles may be equipped with different sensors and/or may have different capabilities, the VADS component may actively seek out one or more other vehicles that can complement the sensor suite of the autonomous vehicle. By forming or joining a caravan with one or more complementing vehicles, the autonomous vehicle may share its perception and processing loads associated with autonomous operations with other vehicle(s) in the caravan for the benefit (e.g., in tell is of efficiency, safety, permissible speed, level of autonomy, etc.) of all vehicles in the caravan.

In some embodiments, the VADS component may be configured to use the ACMs to determine whether any of identified vehicles would provide an operational advantage to the autonomous vehicle if it were to engage in a cooperative driving engagement (e.g., operating the autonomous vehicle in a platoon with an identified vehicle, communicating sensor data with another vehicles, etc.). For example, the VADS component may use V2V communications to determine the destination or planned travel route of an identified vehicle, determine a duration that the identified vehicle will be traveling along a route consistent with a destination of the autonomous vehicle, and determine whether there would be an operational advantage to engaging in a cooperative driving arrangement (e.g., sharing sensor data or forming a caravan) in response to determining that the identified vehicle will be traveling in a same or similar direction as the autonomous vehicle for at least a threshold period of time. In response to determining that there would be an operational advantage to engaging in a cooperative driving arrangement, the VADS component may initiate a cooperative driving engagement in which the autonomous vehicle shares sensor data with the identified vehicle(s) and/or drives in a particular location relative to the identified other vehicle(s) so as to best leverage the sensors of each vehicle. For example, the autonomous vehicle and the identified other vehicle(s) may coordinate to position the vehicle with the best forward looking sensor in the lead of a caravan.

In some embodiments, the VADS component may be configured to determine that there would be an operational advantage to the autonomous vehicle in response to determining that a sensor in an identified vehicle would provide a sensor capability that is not possessed by the autonomous vehicle, and that receiving data from the sensor of the identified vehicle would be beneficial for safety or operational performance of the autonomous vehicle. In response, the VADS component may initiate a cooperative driving engagement in which the autonomous vehicle coordinates with the identified vehicle to leverage the respective sensor capabilities.

In some embodiments, the VADS component may determine that there would be an operational advantage to engaging in a cooperative driving engagement based on the autonomy level of an identified vehicle, such as based on whether the identified vehicle is highly autonomous and includes premium sensors that would enable the autonomous vehicle to operate more safely or with improved performance.

In some embodiments, the VADS component may be configured to determine whether there would be an operational advantage to engaging in the cooperative driving engagement based on driving conditions, such as a roadway condition, a weather condition, a type of roadway, a level of vehicle traffic on the roadway, a speed limit of the roadway, hazards or obstacles along the roadway, lighting conditions, etc. In some embodiments, the VADS component may be configured to determine whether there would be an operational advantage to engaging in the cooperative driving engagement based on a combination of driving conditions and ACMs of surrounding vehicles.

In some embodiments, the VADS component may be configured to use the ACMs to determine whether there would be an operational advantage to modifying the planned route of the autonomous vehicle so that it could reap benefits of a cooperative driving engagement. For example, the VADS component could search along alternative routes (and not just within the current highway) to determine whether there are other vehicles along those routes with which it could enter into a cooperative driving engagement, determine whether there would be significant benefits entering into a cooperative driving engagement with those vehicles, determine whether the added benefits outweigh the cost or added time of taking an alternative route. The host vehicle could alter its planned route to follow an alternative route and initiate/engage in a cooperative driving engagement in response to determining that added benefits outweigh the cost or added time.

In some embodiments, the VADS component may be configured to initiate a cooperative driving engagement by sending a communication message to another vehicle requesting participation in a cooperative driving engagement. In response to the VADS component receiving a confirmation message that indicates the other vehicle will participate, the VADS component may establish direct communication links to the other vehicle and begin receiving information via the direct communication links. The received information may be sensor information, such as raw sensor data or processed sensor data. The received information may also include higher-level driving directives, and/or pre-processed information such as state estimates for surrounding vehicles, aggregated data, etc. The VADS component may use any or all of the received information to adjust one or more of the driving parameters of the autonomous vehicle so that the vehicle can participate in the cooperative driving engagement.

As used herein, the terms "component," "system," "unit," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The term "computing device" is used herein to refer to electronic devices having at least a processor, such as computers integrated within a vehicle, particularly an autonomous vehicle, but may also include mobile communication devices (e.g., any one or all of cellular telephones, smart-phones, web-pads, tablet computers, Internet enabled cellular telephones, laptop computers, etc.), servers, personal computers, etc. configured to communicate with an autonomous vehicle. In various embodiments, a computing device may be configured with one or more network transceivers or interfaces for establishing communications with other devices. For example, computing devices may include a network interface for establishing a wide area network (WAN) connection (e.g., a Long-Term Evolution cellular network connection, etc.), a short-range wireless connection (e.g., a Bluetooth®, RF, etc.), and/or a local area network (LAN) connection (e.g., a wired or wireless connection to a Wi-Fi® router, etc.).

The various embodiments include autonomous vehicles that are configured to communicate using vehicle-based wireless communications. The cellular vehicle-to-everything (C-V2X) protocol serves as the foundation for vehicle-based wireless communications. In particular, C-V2X defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated ITS 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G NR systems, etc.), etc.

Of particular usefulness to autonomous driving are the V2V communications between or among motor vehicles. V2V systems and technologies hold great promise for improving traffic flows and vehicle safety by enabling vehicles to share information regarding their location, speed, direction of travel, braking, and other factors that may be useful to other vehicles for anti-collision and other safety functions. Vehicles equipped with V2V onboard equipment will frequently (e.g. up to 20 times per second) transmit their vehicle information in packets referred to as Basic Safety Messages (BSM). Autonomous vehicles equipped with an Advanced Driver Assistance System (ADAS) may receive and use such V2V communications to control their speed and position with respect to other vehicles, and form a caravan that allows them to make coordinated maneuvering and navigation decisions.

The ADAS systems installed in different vehicles may vary dramatically. For example, high-end vehicles (Tesla P100D, Mercedes S-class, etc.) may include precise sensors and a fully autonomous driving systems that reliably maintain the vehicle at a certain speed, within a certain distance of the edges of the driving lane, and within a certain distance from other vehicles, etc. However, ADAS systems in older or less expensive vehicles may not be as accurate or reliable. In addition, some vehicles will not be fully autonomous all the time, such as when the human driver takes manual control of the vehicle. Further, some of the vehicles may have reduced capabilities due to normal wear and tear, inadequate maintenance, or age. Older vehicles may have outdated sensors and lesser degrees of autonomy (e.g., accident avoidance system that applies breaks, adaptive cruise control that maintains a certain distance from other vehicles, etc.).

In order for autonomous vehicles to work effectively together as part of a caravan, the ADAS systems in each vehicle may take into consideration the varying levels of capability and autonomy of surrounding vehicles that are effective at each instant. In addition, the ADAS systems may adapt to other dynamic factors such as their driver preferences, driver engagement, individual programing, levels of maintenance and use, etc. that could alter the behavior of surrounding vehicles. These factors have an impact on the capabilities, behaviors, and level of autonomy of surrounding vehicles, but can generally only be known by observing and analyzing the vehicle while it is in operation.

By equipping vehicles with a VADS automotive control system that adjusts the behaviors or operations of other vehicles based on predicted or dynamically determined capabilities of other surrounding vehicles, various embodiments improve the performance and functions of autonomous vehicles, and allow multiple autonomous vehicles to work more effectively as part of a caravan to increase traffic efficiency and safety.

In some embodiments, the VADS component may be configured to determine and use ACMs (or the levels of autonomy) of the surrounding vehicles to identify the vehicles with which to coordinate, and the nature and extent of the coordination. For example, the VADS component may be configured to coordinate only with surrounding vehicles that have a level of autonomy (or ACM value) that exceeds a threshold value. As another example, the VADS component may be configured to perform certain coordinated maneuvers only when all the surrounding vehicles have a level of autonomy (or ACM value) that exceeds the threshold value.

In some embodiments, the VADS component may be configured to adjust its driving parameters to be more or less reliant on the capabilities of nearby vehicles.

In some embodiments, the VADS component may be configured to adjust how the autonomous vehicle is controlled by modifying a data/behavioral model associated with another vehicle based on the determined capabilities and level of autonomy. That is, the VADS component may use ACMs and data/behavioral models of other vehicles to anticipate how the other vehicles will behave (speed, turning, braking, etc.), and to ensure proper driving parameters (e.g., separation distances, etc.) are observed while moving in coordination with the other vehicles. If the determined ACMs is less than that presumed in a behavior model for the corresponding vehicle, the VADS component may adjust or modify the behavior model of the other vehicle to more accurately reflect the determined level of autonomy or capability. In this manner, the VADS can better determine how to maneuver to maintain safe and appropriate separation distances from other vehicles by anticipating how the other vehicles are likely to behave and maneuver.

In some embodiments, the VADS component may be configured to take responsive actions based on the ACMs or behaviors of surrounding vehicles. For example, if a vehicle is tailgating the autonomous vehicle and V2V communications indicate that the vehicle is being operated manually, the VADS could cause the autonomous vehicle to change lanes in order to allow the vehicle to pass. Such lane changing could be coordinated with other surrounding vehicles via V2V communications based on determining that such other surrounding vehicles have sufficient autonomy to support such coordination and to control their vehicles accordingly.

As another example, the VADS could determine that a vehicle within a caravan of autonomous vehicles has switched over to being operated manually, or has requested to leave the caravan and is not allowed to switch to manual control until after exiting. In response, the VADS may coordinate with the other autonomous vehicles (i.e., vehicles determined to have a sufficient level of autonomy) in the caravan to clear a path for the vehicle to leave the caravan. The VADS component may allow the vehicle to leave the caravan by clearing a path for the vehicle to change lanes, increasing follow distance, allowing other autonomous vehicles surrounding the vehicle to move, etc.

As another example, the VADSs in each of a group of vehicles may coordinate actions to form or conduct a caravan by selecting the vehicle with the highest level of autonomy and best forward-looking sensors to lead the caravan while vehicles with lesser levels of autonomy move to the back of the caravan. Thus, as part of coordinating driving behaviors with surrounding vehicles to increase traffic efficiency (e.g., by caravanning) and safety (e.g., by coordinating speeds, braking and separation distances), the VADS component may use the level of autonomy determined for each surrounding vehicle to identify the vehicles with which to coordinate and the appropriate locations of each vehicle in the caravan.

In some embodiments, the VADS component may be configured to detect the levels of autonomy of nearby vehicles directly through C-V2X or V2V communications with the nearby vehicles. For example, the VADS component may receive an ACM from a nearby vehicle that identifies the nearby vehicle as having a high level of autonomy (e.g., category 5 autonomy, level 65 autonomy, etc.). That is, in some embodiments, the level of autonomy may be directly queried using C-V2X or V2V communications.

In some embodiments, the VADS component may be configured detect the level of autonomy of nearby vehicles by implementing or using various observation, monitoring, machine learning and/or prediction techniques. For example, the VADS component may predict that a nearby vehicle has a high level of autonomy based on observing that the nearby vehicle is equipped with a sophisticated LIDAR sensor from a reputable manufacturer. Similarly, the VADS component may predict that a nearby vehicle has a low level of autonomy based on observing that the nearby vehicle is not adequate equipped with communications circuitry suitable for supporting V2V communications, or otherwise lacks particular sensing or communication modules. The VADS component may also predict the level of autonomy based on observed driving behaviors and other similar factors.

In some embodiments, the VADS component may be configured to dynamically determine or adjust ACMs, safety thresholds, behavioral prediction models, motion planning policies, control/driving parameters, etc. based on the determined levels of autonomy of the other vehicles. The VADS component may adjust any or all such value/parameters to improve traffic flow, reduce traffic and congestion, increase road safety, or accomplish other goals or objectives.

As mentioned above, the VADS component may use information collected from a vehicle's sensors in conjunction with information received via V2V communications to determine an ACM that identifies the level of autonomy and/or capability of a nearby vehicle. In some embodiments, the ACM may identify the level of autonomy via information that reflects the sophistication of that vehicle's capabilities, which may encompass information regarding the vehicle's computing capability (e.g., processor speed), sensors, processing algorithms, prediction and control strategies, etc. In some embodiments, the ACM may identify the level of autonomy in terms of a continuum value (e.g., a spectrum) or values that range from fully manual driving to fully automated driving with zero human intervention. In some embodiments, the ACM may identify the level of autonomy via a set of discrete category values (e.g. L0 to L5). In some embodiments, the ACM may identify the level of autonomy via a vector or matrix of values reflective of different aspects of autonomy and vehicle performance, such as values associated with each of a vehicle's computing capability, sensors, processing algorithms, prediction and control strategies, current autonomy setting (e.g., manual, semi-autonomous, or fully autonomous), etc.

The VADS component may determine the ACM by receiving, generating, computing or otherwise determining the plurality of values that make up the ACM, and collectively processing the ACM values to identify or predict the level of autonomy or performance capabilities of the nearby vehicle. In some embodiments, one or more of these ACM values may categorize, represent or characterize an observed driving behavior. Non-limiting examples of ACM values that represent one or more of: erratic driving behavior; smooth driving behavior; predictable driving behavior; the consistency, regularity or uniformity of vehicle operations; a level of predictability for future vehicle operations; driver aggressiveness or a level of driver aggression; a degree to which a vehicle tracks a center of a driving lane (e.g., by analyzing lateral errors and lateral error rates, with lower lateral error rates being indicative of greater sophistication of autonomous systems); the number of driving errors observed per unit time (e.g., per minute); the degree to which the vehicle complies with local road rules (e.g., speed limit, posted signs, turn signals, etc.); compliance with safety rules; reaction times (e.g., observed time to respond to respond to actions of other vehicles); responsiveness or how the vehicle reacts to external stimuli (e.g., determining whether a vehicle reacts to braking of two, three, or more vehicles ahead vs. only reacting to the vehicle directly in front); etc.

In some embodiments, one or more ACM values may categorize, represent or characterize a sensor capability that is determined by the VADS component based on observed or received information. For example, the ACM values may represent the types of sensors present in the other vehicle, the make and/or manufacturer of sensors of the other vehicle, the number of autonomous driving sensors included in the other vehicle, the accuracy and/or precision of the sensors of the other vehicle, etc.

In some embodiments, one or more ACM values may be based on certified information (or certificates) received via C-V2X communications. For example, the ACM values may identify or represent a key performance indicator (KPI), a surface performance rating (e.g., asphalt, concrete, etc.), a weather performance rating (e.g., wet conditions, icy conditions, snow, etc.), a vehicle capability, a vehicle feature, a supported algorithm, etc., any or all of which may have been certified for the vehicle by an appropriate certification organization (e.g., national highway traffic safety administration, the tire industry association, the original equipment manufacturer, etc.).

In some embodiments, the VADS in an autonomous vehicle may be configured to estimate the levels of autonomy of identified surrounding vehicles. In various embodiments, this may be accomplished by generating a single value or a continuum of values that collectively identify an estimate for the level of autonomy. In some embodiments, each of the values in the continuum of values may represent a different predicted, collected or observed feature, factor or data point associated with an identified surrounding vehicle. In some embodiments, the continuum of values may be formatted in a map, matrix or vector data structure that characterizes or represents an estimate of a vehicle's level of autonomy. In some embodiments, the VADS component may be further configured to determine confidence or uncertainty values for estimates. The VADS component may adjust the driving parameters of the autonomous vehicle based on the estimates and the confidence/uncertainty values associated with the estimates. The VADS component may adjust the driving parameters to adapt to the environment or traffic conditions and/or to strike a balance between safety and efficiency in terms of traffic throughput.

In some embodiments, the VADS component may adjust the driving parameters in a discrete way based on a combination of the vehicle's role or classification (e.g. lead vehicle, trailing vehicle, vehicles in adjacent lanes) in a collaborative operating arrangement (e.g., a caravan) and its level of autonomy. In some embodiments, the VADS component may adjust the driving parameters in a continuous way based on the estimated level of autonomy along a continuum and its associated uncertainty. For example, the VADS component may modify its following distance parameter based on its assessment of a leader vehicle's level of autonomy, leaving a large amount of space for a human-driven vehicle to allow for unpredictable stops and a very small amount of space for a fully autonomous and connected vehicle capable of sharing its state and its estimate of the world with surrounding vehicles.

In some embodiments, the VADS component may be configured to allow a group of autonomous vehicles to form a tightly-grouped caravan. This may be accomplished by sharing state information, such as motion plans and behavioral predictions, and allowing vehicles with lower levels of autonomy to pass through the group safely. A human-driven vehicle tailgating a tightly-grouped caravan with high levels of autonomy may be allowed to pass through by the vehicles coordinating with each other to clear a lane. A driver riding within a tightly-grouped pack of autonomous vehicles may request to take over manual control, resulting in the vehicles clearing an exit path for the vehicle to exit the caravan, and potentially giving manual control to the driver only after the vehicle has safely exited the caravan.

In some embodiments, the VADS component may be configured to leverage autonomous capabilities and sensor packages of nearby vehicles having higher levels of autonomy so as to increase the effective level of autonomy that can be achieved as a group or to benefit from shared computational resources, state estimation, etc. One example includes having a caravan of vehicles where the lead vehicle has the highest levels of autonomy and trailing vehicles not capable of full autonomy on their own leverage its autonomous capabilities to follow closely behind. In some embodiments, vehicles may actively seek nearby vehicles with higher levels of autonomy in order to form autonomous caravans, sharing the perception and processing load to benefit from the capabilities of the group. In some embodiments, vehicles may reduce their perception and processing online in order to save power. For example, vehicles in the middle of the caravan may simply follow the lead vehicle and not use resources on longer range estimation, whereas the lead vehicle may devote significant resources to long range estimation and prediction. Additionally, the vehicles could potentially focus their processing on certain regimes in order to make better use of the total computational resources of all vehicles in the caravan. For example, the lead vehicle may focus sensors and sensor data processing on the area ahead of the caravan, and the rear vehicle may focus sensors and sensor data processing on the area behind it. In some embodiments, autonomous vehicles may actively seek out other vehicles to form such collaborative groups in order to maximize power efficiency.

Figure 1B:
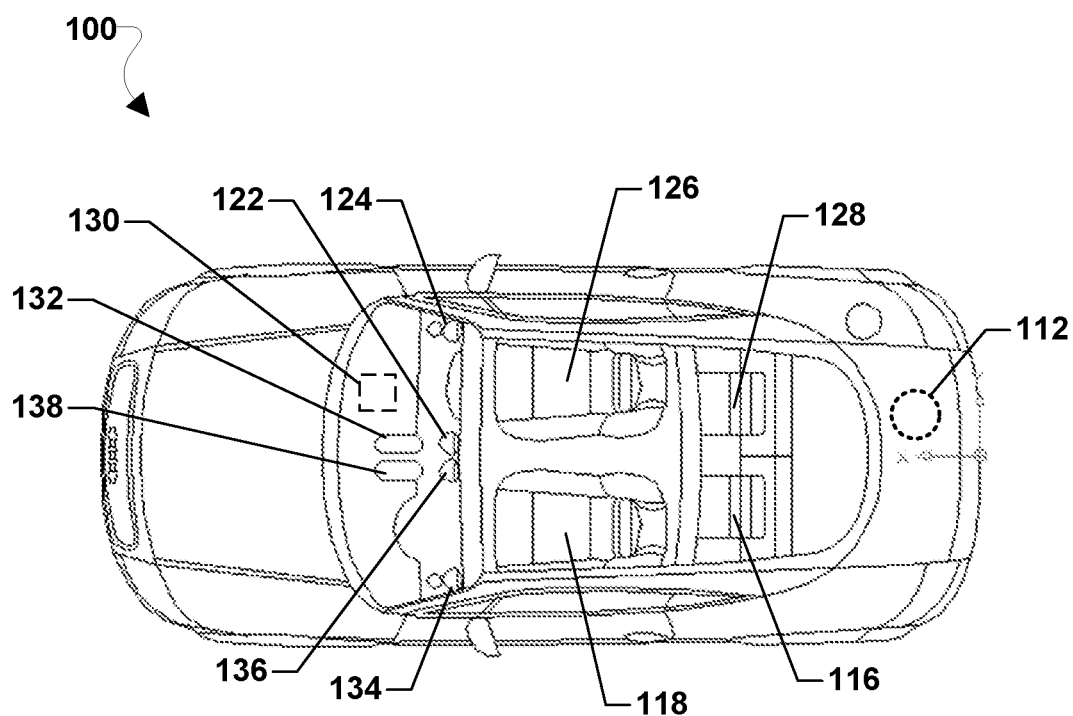

Various embodiments may be implemented within a variety of host vehicles, an example vehicle 100 of which is illustrated in FIGS. 1A and 1B. With reference to FIGS. 1A and 1B, a host vehicle 100 may include a plurality of sensors 102-138 disposed in or on the host vehicle that are used for various purposes involved in autonomous and semiautonomous navigation as well as sensor data regarding objects and people in or on the host vehicle 100. The sensors 102-138 may include one or more of a wide variety of sensors capable of detecting a variety of information useful for navigation and collision avoidance. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The host vehicle control unit 140 may be configured with processor-executable instructions to perform various embodiments using information received from various sensors, such as the cameras 122, 136. In some embodiments, the control unit 140 may supplement the processing of camera images using distance and relative position (e.g., relative bearing angle) that may be obtained from radar 132 and/or lidar 138 sensors. The control unit 140 may further be configured to control steering, breaking and speed of the host vehicle 100 when operating in an autonomous or semiautonomous mode using information regarding other vehicles determined using various embodiments. In some embodiments, the control unit 140 may be configured to implement all or portions of the vehicle autonomous driving system (VADS) discussed throughout this application.

Figure 1C:
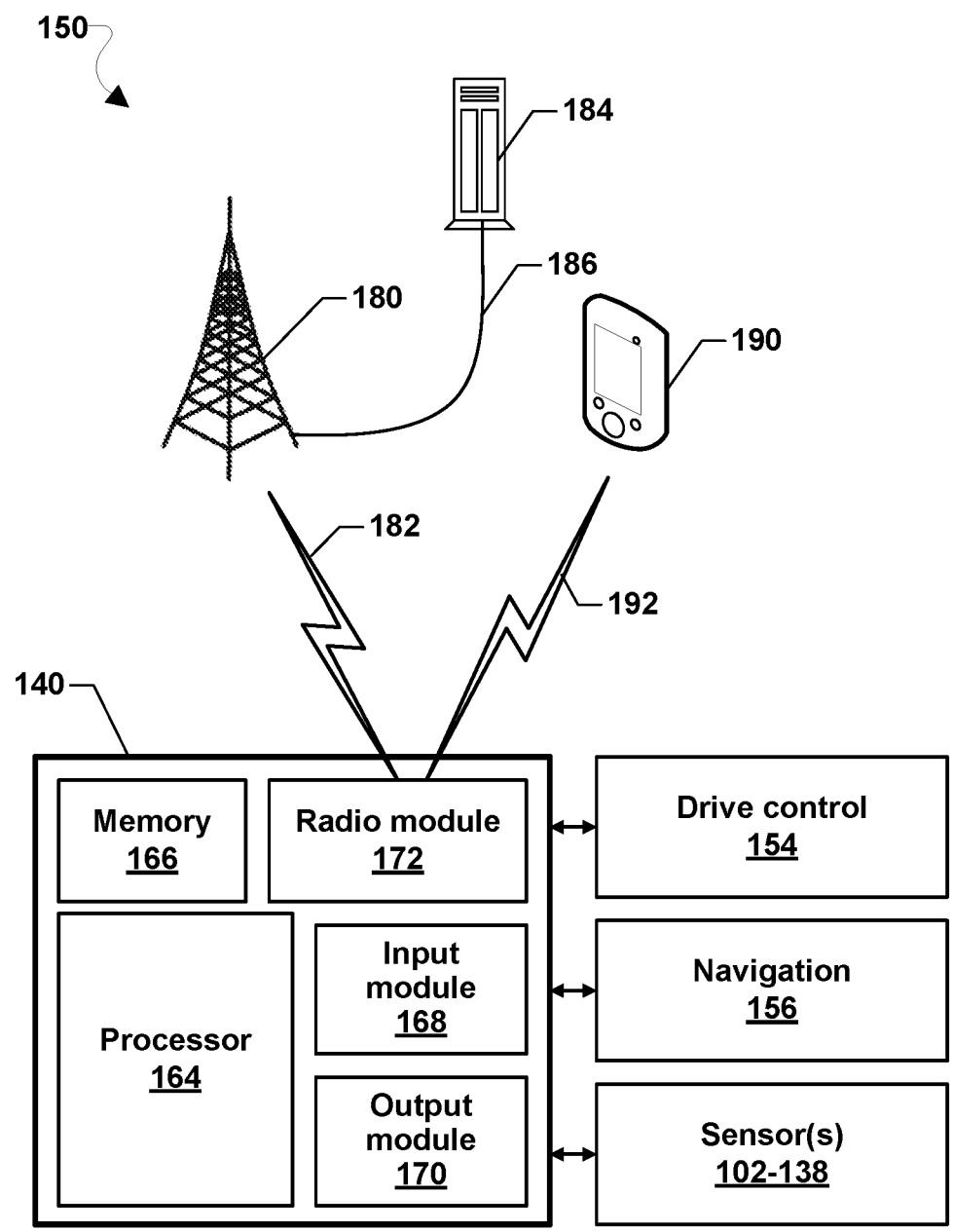
FIG. 1C is a component block diagram illustrating components of a vehicle suitable for implementing various embodiments.

FIG. 1C is a component block diagram illustrating a system 150 of components and support systems suitable for implementing various embodiments. With reference to FIGS. 1A, 1B, and 1C, a host vehicle 100 may include a control unit 140, which may include various circuits and devices used to control the operation of the host vehicle 100. The control unit 140 may be coupled to and configured to control drive control components 154, navigation components 156, and one or more sensors 102-138 of the host vehicle 100.

The control unit 140 may include a processor 164 configured with processor-executable instructions to control maneuvering, navigation, and other operations of the host vehicle 100, including operations of various embodiments. The processor 164 may be coupled to a memory 166. The control unit 140 may include an input module 168, an output module 170, and a radio module 172. In some embodiments, the processor 164 may be configured to implement the functions of the vehicle autonomous driving system (VADS) discussed throughout this application.

The radio module 172 may be configured for wireless communication. The radio module 172 may exchange signals 182 (e.g., command signals for controlling maneuvering, signals from navigation facilities, etc.) with a network transceiver 180, and may provide the signals 182 to the processor 164 and/or the navigation unit 156. In some embodiments, the radio module 172 may enable the host vehicle 100 to communicate with a wireless communication device 190 through a wireless communication link 192. The wireless communication link 192 may be a bidirectional or unidirectional communication link, and may use one or more communication protocols.

The input module 168 may receive sensor data from one or more vehicle sensors 102-138 as well as electronic signals from other components, including the drive control components 154 and the navigation components 156. The output module 170 may be used to communicate with or activate various components of the host vehicle 100, including the drive control components 154, the navigation components 156, and the sensor(s) 102-138.

The control unit 140 may be coupled to the drive control components 154 to control physical elements of the host vehicle 100 related to maneuvering and navigation of the host vehicle, such as the engine, motors, throttles, steering elements, flight control elements, braking or deceleration elements, and the like. The drive control components 154 may also include components that control other devices of the host vehicle, including environmental controls (e.g., air conditioning and heating), external and/or interior lighting, interior and/or exterior informational displays (which may include a display screen or other devices to display information), and other similar devices.

The control unit 140 may be coupled to the navigation components 156, and may receive data from the navigation components 156 and be configured to use such data to determine the present position and orientation of the host vehicle 100, as well as an appropriate course toward a destination. In various embodiments, the navigation components 156 may include or be coupled to a global navigation satellite system (GNSS) receiver system (e.g., one or more Global Positioning System (GPS) receivers) enabling the host vehicle 100 to determine its current position using GNSS signals. Alternatively or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control elements 154, the processor 164 may control the host vehicle 100 to navigate and maneuver. The processor 164 and/or the navigation components 156 may be configured to communicate with a server 184 on a network 186 (e.g., the Internet) using a wireless connection 182 with a cellular data network 180 to receive commands to control maneuvering, receive data useful in navigation, provide real-time position reports, and assess other data.

The control unit 140 may be coupled to one or more sensors 102-138 as described, and may be configured to provide a variety of data to the processor 164.

While the control unit 140 is described as including separate components, in some embodiments some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of various embodiments when installed into a host vehicle.

Figure 2:
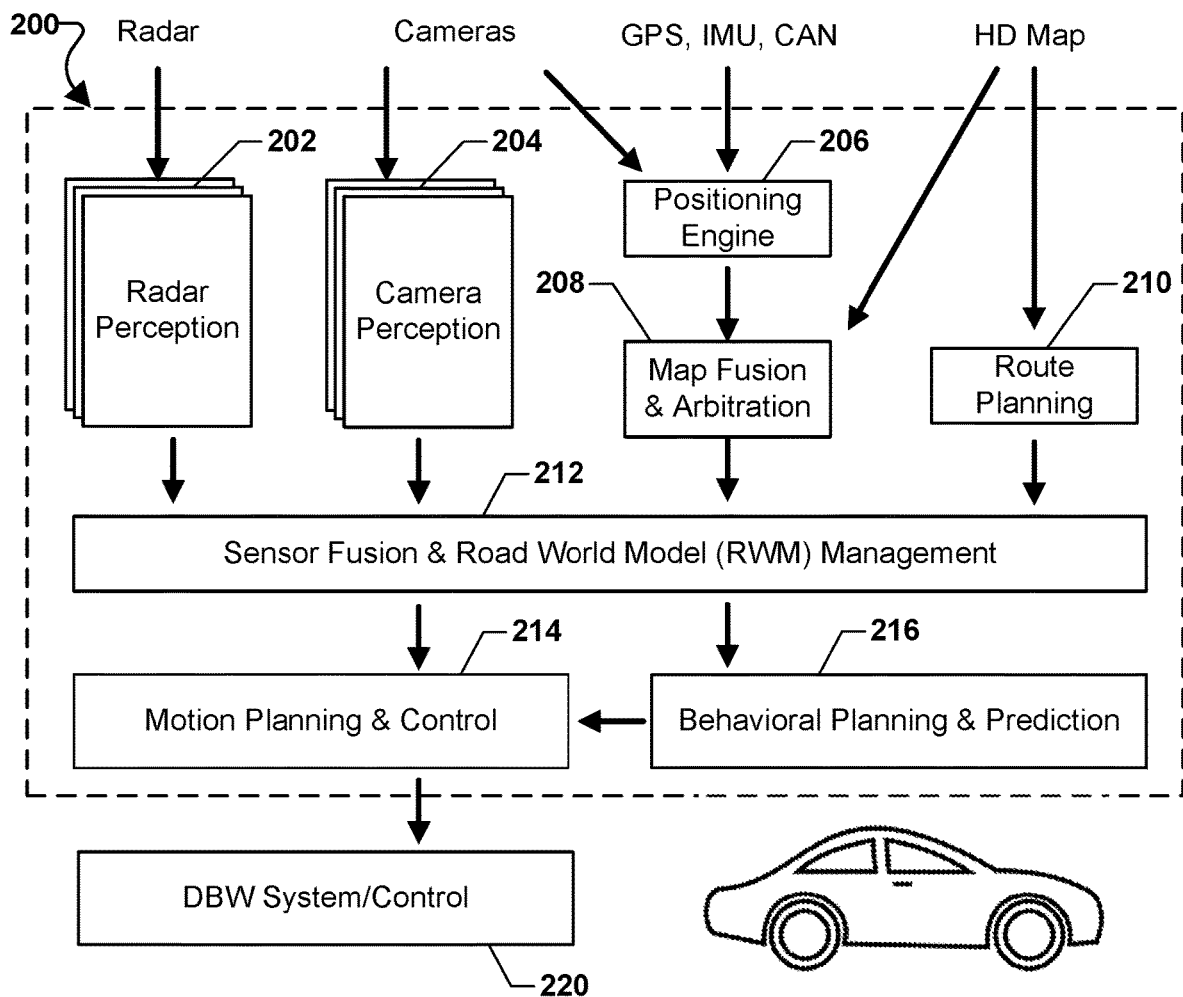
FIG. 2 is a component block diagram illustrating components of an example vehicle management system according to various embodiments.

FIG. 2 illustrates an example of subsystems, computational elements, computing devices or units within vehicle management system 200, which may be utilized within a host vehicle 100. In some embodiments, the various computational elements, computing devices or units within vehicle management system 200 may be implemented within a system of interconnected computing devices (i.e., subsystems), that communicate data and commands to each other (e.g., indicated by the arrows in FIG. 2). In other embodiments, the various computational elements, computing devices or units within vehicle management system 200 may be implemented within a single computing device, such as separate threads, processes, algorithms or computational elements. Therefore, each subsystem/computational element illustrated in FIG. 2 is also generally referred to herein as "layer" within a computational "stack" that constitutes the vehicle management system 200. However, the use of the terms layer and stack in describing various embodiments are not intended to imply or require that the corresponding functionality is implemented within a single autonomous (or semi-autonomous) vehicle control system computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

With reference to FIGS. 1A-2, the vehicle management system stack 200 may include a radar perception layer 202, a camera perception layer 204, a positioning engine layer 206, a map fusion and arbitration layer 208, a route planning layer 210, sensor fusion and road world model (RWM) management layer 212, motion planning and control layer 214, and behavioral planning and prediction layer 216. The layers 202-216 are merely examples of some layers in one example configuration of the vehicle management system stack 200 and in other configurations other layers may be included, such as additional layers for other perception sensors (e.g., LIDAR perception layer, etc.), additional layers for planning and/or control, additional layers for modeling, additional layers for implementing the vehicle autonomous driving system (VADS), etc., and/or certain of the layers 202-216 may be excluded from the vehicle management system stack 200. Each of the layers 202-216 may exchange data, computational results and commands as illustrated by the arrows in FIG. 2. Further, the vehicle management system stack 200 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The vehicle management system stack 200 may output vehicle control commands or signals to the drive by wire (DBW) system/control unit 220, which is a system, subsystem or computing device that interfaces directly with vehicle steering, throttle and brake controls.

The radar perception layer 202 may receive data from one or more detection and ranging sensors, such as radar 132 and/or lidar 138, and process the data to recognize and determine locations of other vehicles and objects within a vicinity of the host vehicle 100. The radar perception layer 202 may include use of neural network processing and artificial intelligence methods to recognize objects and vehicles, and pass such information on to the sensor fusion and RWM management layer 212.

The camera perception layer 204 may receive data from one or more cameras, such as cameras 122, 136, and process the data to recognize and determine locations of other vehicles and objects within a vicinity of the host vehicle 100. The camera perception layer 204 may include use of neural network processing and artificial intelligence methods to recognize objects and vehicles, and pass such information on to the sensor fusion and RWM management layer 212.

The positioning engine layer 206 may receive data from various sensors and process the data to determine a position of the host vehicle 100. The various sensors may include, but is not limited to, a GPS receiver, an IMU, and/or other sensors connected via a CAN bus. The positioning engine layer 206 may also utilize inputs from one or more cameras, such as cameras 122, 136 and/or any other available sensor, such as radars, LIDARs, etc.

The map fusion and arbitration layer 208 may access data within a high definition (HD) map database and receive output received from the positioning engine layer 206 and process the data to further determine the position of the host vehicle 100 within the map, such as location within a lane of traffic, position within a street map, etc. The HD map database may be stored in a memory, such as memory 166. For example, the map fusion and arbitration layer 208 may convert latitude and longitude information from GPS into locations within a surface map of roads contained in the HD map database. GPS position fixes include errors, so the map fusion and arbitration layer 208 may function to determine a best guess location of the host vehicle within a roadway based upon an arbitration between the GPS coordinates and the HD map data. For example, while GPS coordinates may place the host vehicle near the middle of a two-lane road in the HD map, the map fusion and arbitration layer 208 may determine from the direction of travel that the host vehicle is most likely aligned with the travel lane consistent with the direction of travel. The map fusion and arbitration layer 208 may pass map-based location information to the sensor fusion and RWM management layer 212.

The route planning layer 210 may utilize the HD map, as well as inputs from an operator or dispatcher to plan a route to be followed by the host vehicle 100 to a particular destination. The route planning layer 210 may pass map-based location information to the sensor fusion and RWM management layer 212. However, the use of a prior map by other layers, such as the sensor fusion and RWM management layer 212, etc., is not required. For example, other stacks may operate and/or control the vehicle based on perceptual data alone without a provided map, constructing lanes, boundaries, and the notion of a local map as perceptual data is received.

The sensor fusion and RWM management 212 may receive data and outputs produced by the radar perception layer 202, camera perception layer 204, map fusion and arbitration layer 208, and route planning layer 210, and use some or all of such inputs to estimate or refine the location and state of the host vehicle 100 in relation to the road, other vehicles on the road, and other objects within a vicinity of the host vehicle 100. For example, the sensor fusion and RWM management 212 may combine imagery data from the camera perception layer 204 with arbitrated map location information from the map fusion and arbitration layer 208 to refine the determined position of the host vehicle within a lane of traffic. As another example, the sensor fusion and RWM management 212 may combine object recognition and imagery data from the camera perception layer 204 with object detection and ranging data from the radar perception layer 202 to determine and refine the relative position of other vehicles and objects in the vicinity of the host vehicle. As another example, the sensor fusion and RWM management 212 may receive information from vehicle-to-vehicle (V2V) communications (such as via the CAN bus) regarding other vehicle positions and directions of travel, and combine that information with information from the radar perception layer 202 and the camera perception layer 204 to refine the locations and motions of other vehicles. The sensor fusion and RWM management 212 may output refined location and state information of the host vehicle 100, as well as refined location and state information of other vehicles and objects in the vicinity of the host vehicle, to the motion planning and control layer 214 and/or the behavior planning and prediction layer 216.

The behavioral planning and prediction layer 216 may use the refined location and state information of the host vehicle 100 and location and state information of other vehicles and objects output from the sensor fusion and RWM management layer 212 to predict future behaviors of other vehicles and/or objects. For example, the behavioral planning and prediction layer 216 may use such information to predict future relative positions of other vehicles in the vicinity of the host vehicle based on own vehicle position and velocity and other vehicle positions and velocity. Such predictions may take into account information from the HD map and route planning to anticipate changes in relative vehicle positions as host and other vehicles follow the roadway. The behavioral planning and prediction layer 216 may output other vehicle and object behavior and location predictions to the motion planning and control layer 214.

Additionally, the behavior planning and prediction layer 216 may plan and generate control signals for controlling the motion of the host vehicle 100. For example, based on route planning information, refined location in the roadway information, and relative locations and motions of other vehicles, the behavior planning and prediction layer 216 may determine that the host vehicle 100 needs to change lanes and accelerate, such as to maintain or achieve minimum spacing from other vehicles, and/or prepare for a turn or exit. As a result, the behavior planning and prediction layer 216 may calculate or otherwise determine a steering angle for the wheels and a change to the throttle to be commanded to the motion planning and control layer 214 and DBW system control layer 220 along with such various parameters necessary to effectuate such lane change and accelerate. One such parameter may be a computed steering wheel command angle.

The motion planning and control layer 214 may receive data and information outputs from the sensor fusion and RWM management layer 212 and other vehicle and object behavior as well as location predictions from the behavior planning and prediction layer 216, and use this information to plan and generate control signals for controlling the motion of the host vehicle 100 and to verify that such control signals meet safety requirements for the host vehicle 100. For example, based on route planning information, refined location in the roadway information, and relative locations and motions of other vehicles, the motion planning and control layer 214 may verify and pass various control commands or instructions to the DBW system/control unit 220.

The DBW system/control unit 220 may receive the commands or instructions from the motion planning and control layer 214 and translate such information into mechanical control signals for controlling wheel angle, brake and throttle of the host vehicle 100. For example, DBW system/control 220 may respond to the computed steering wheel command angle by sending corresponding control signals to the steering wheel controller.

In various embodiments, the vehicle management system stack 200 may include functionality that performs safety checks or oversight of various commands, planning or other decisions of various layers that could impact vehicle and occupant safety. Such safety check or oversight functionality may be implemented within a dedicated layer (not shown) or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter (s), and issue a warning or command if the safety parameter is or will be violated. For example, a safety or oversight function in the behavior planning and prediction layer 216 (or in a separate layer not shown) may determine the current or future separate distance between another vehicle (as refined by the sensor fusion and RWM management layer 212) and the host vehicle (e.g., based on the world model refined by the sensor fusion and RWM management layer 212), compare that separation distance to a safe separation distance parameter stored in memory, and issue instructions to the motion planning and control layer 214 to speed up, slow down or turn if the current or predicted separation distance violates the safe separation distance parameter. As another example, safety or oversight functionality in the motion planning and control layer 214 (or a separate layer not shown) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 3:
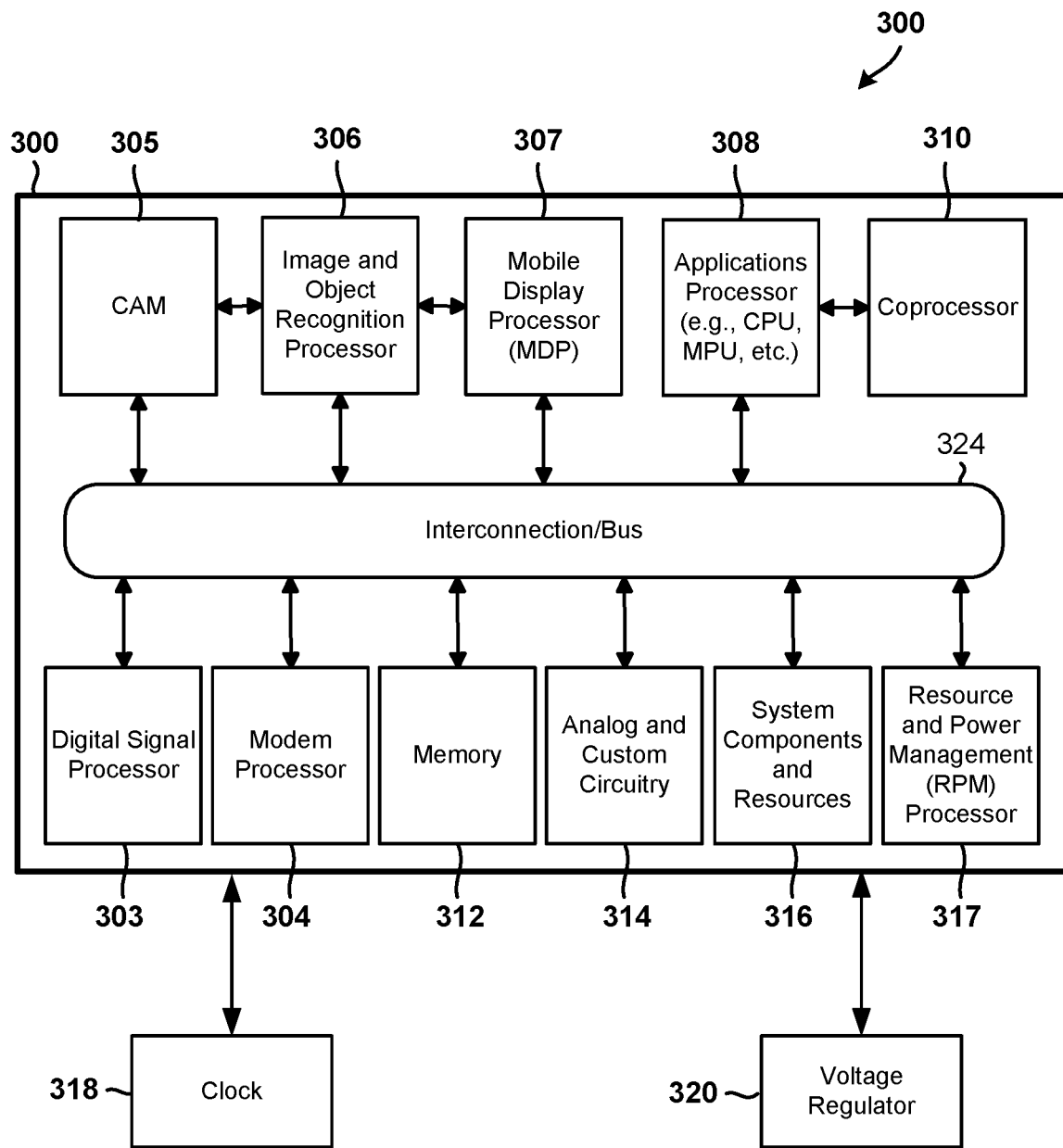
FIG. 3 is a block diagram illustrating components of an example system on chip for use in a vehicle that may be configured to collect and analyze sensor information in accordance with various embodiments.

FIG. 3 illustrates an example system-on-chip (SOC) architecture of a processing device SOC 300 suitable for implementing various embodiments in vehicles. With reference to FIGS. 1A-3, the processing device SOC 300 may include a number of heterogeneous processors, such as a digital signal processor (DSP) 303, a modem processor 304, an image and object recognition processor 306, a mobile display processor (MDP) 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

In some embodiments, one or more of the heterogeneous processors 303, 304, 306, 307, 308, 317 may be configured to implement all or portions of the vehicle autonomous driving system (VADS) discussed throughout this application.

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry (CAM) 305 that includes, provides, controls and/or manages the operations of one or more cameras 122, 136 (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras (e.g., 122, 136) via the CAM 305 to recognize and/or identify other vehicles, and otherwise perform functions of the camera perception layer 204 as described. In some embodiments, the processor 306 may be configured to process radar or lidar data and perform functions of the radar perception layer 202 as described.

The system components and resources 316, analog and custom circuitry 314, and/or CAM 305 may include circuitry to interface with peripheral devices, such as cameras 122, 136, radar 132, lidar 138, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 4:
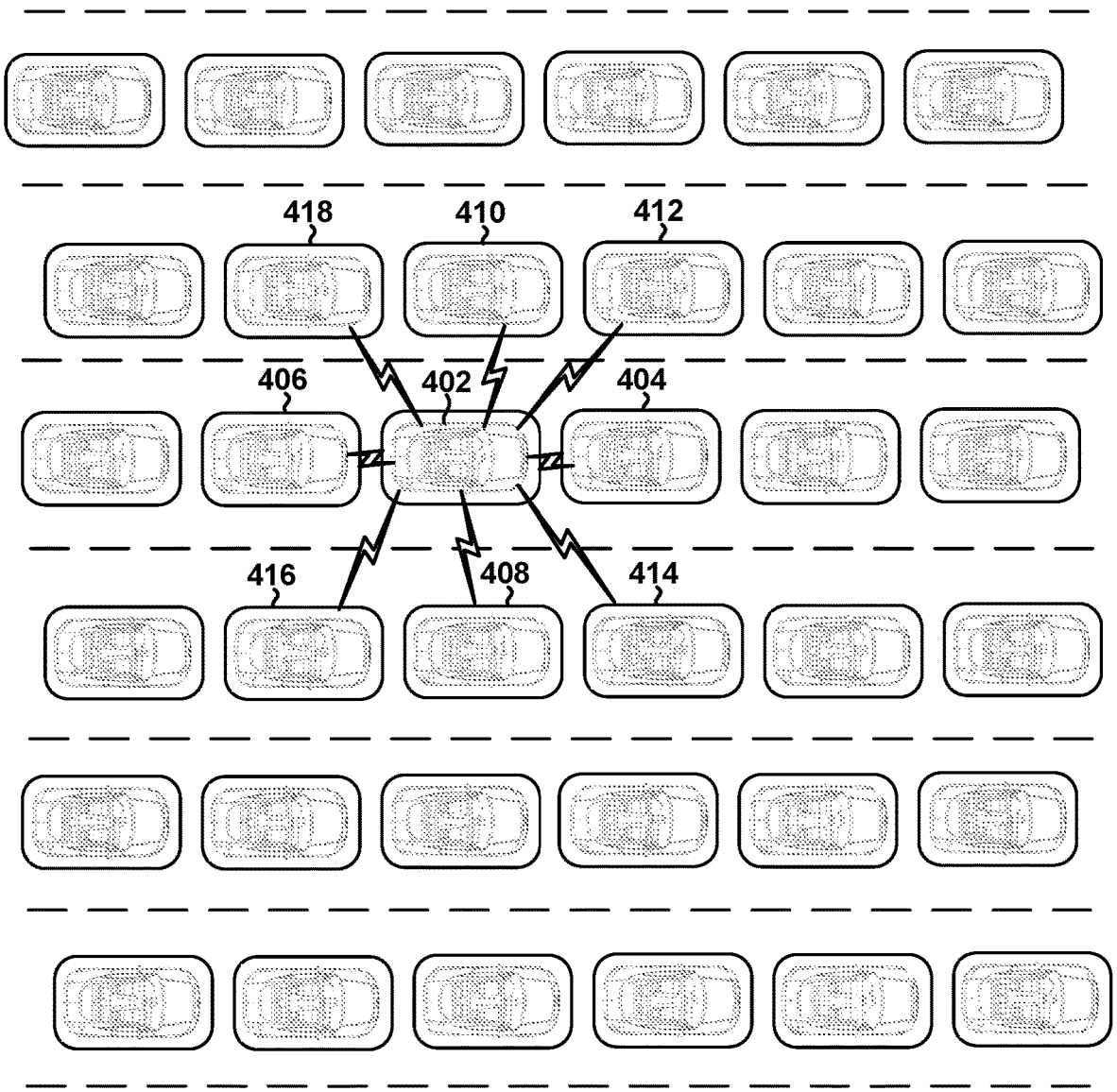
FIG. 4 is an illustration of a six-lane highway that includes autonomous vehicles that are configured to use vehicle-based communications to safely travel in close proximity to one another in accordance with the various embodiments to increase traffic throughput.

FIG. 4 illustrates how autonomous cars can safely operate with significantly smaller margins around each other. With reference to FIGS. 1A-4, an autonomous vehicle 402 uses V2V communications to communicate with surrounding vehicles 404-418, and executes driving controls (steering, throttle and brake) according to driving parameters (e.g., minimum separation distance) and with inputs from behavior models of surrounding vehicles to safely travel in close physical proximity to the surrounding 404-418 to increase traffic throughput. For example, the autonomous vehicle 402 may be equipped with VADS that uses information collected from the vehicle's sensors (e.g., camera, radar, LIDAR, etc.) in conjunction with information received via V2V communications from the surrounding vehicles 404-418 to determine ACMs for each of the surrounding vehicles 404-418. The VADS component may use the ACMs to adjust the driving parameters of the autonomous vehicle 402, such as the minimum following distance between the autonomous vehicle 402 and the vehicle 406 immediately in front and/or the minimum separation distance between the autonomous vehicle 402 and the side vehicles 408 and 410.

Figure 5:
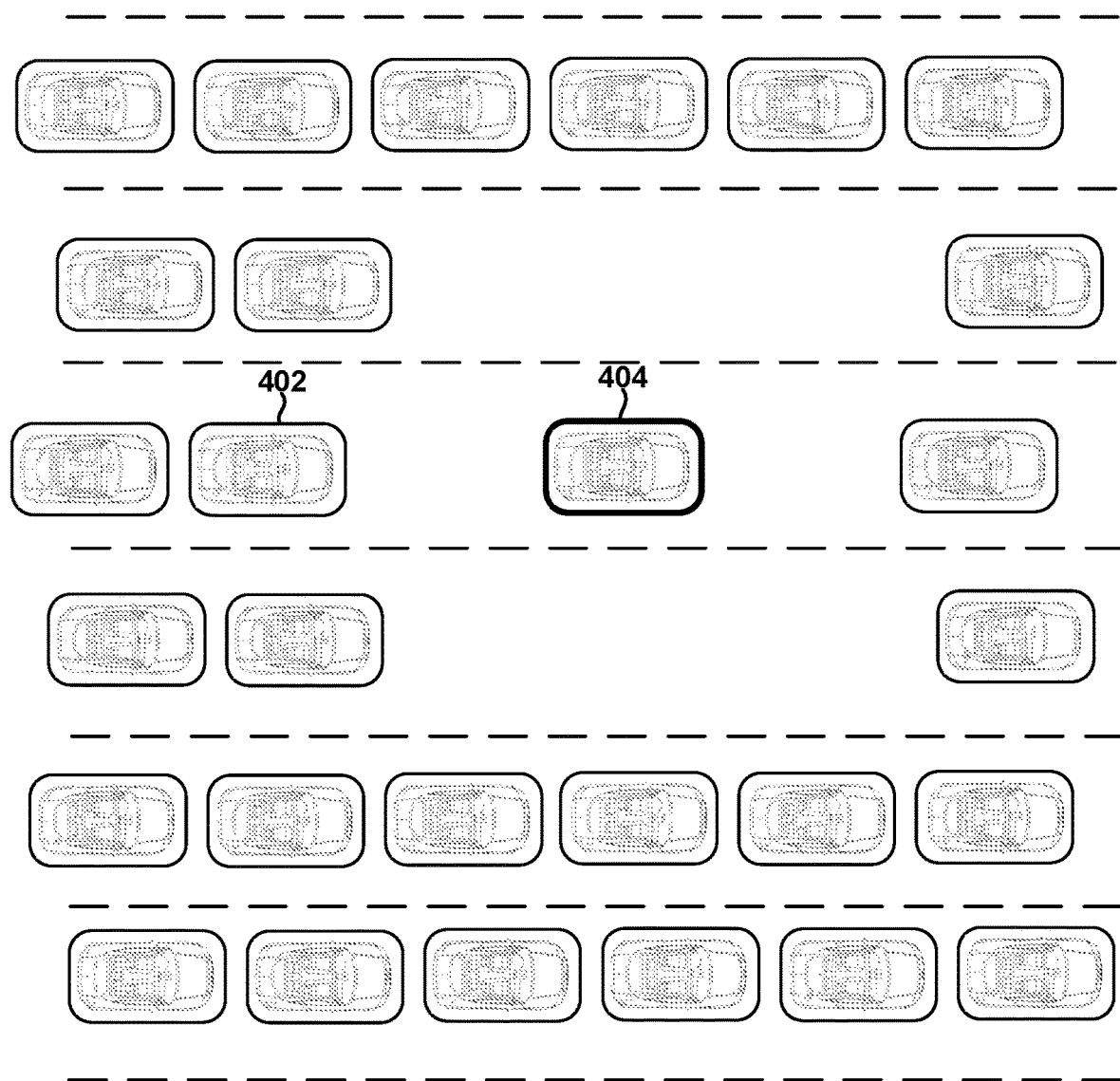
FIG. 5 is an illustration of a six-lane highway that includes autonomous connected vehicles that are configured to maintain increased safety margins around manually-driven car.

FIG. 5 illustrates an example in which autonomous connected vehicles coordinate to maintain increased safety margins around a manually-driven car. With reference to FIGS. 1A-5, the VADS in the autonomous vehicle 402 uses V2V to query the level of autonomy the vehicle 404 immediately in front (or to predict the level of autonomy based on observed driving behaviors of the vehicle 404), and determines that the vehicle 404 is being manually operated by a human driver and/or otherwise does not have the required level of autonomy to follow at a close distance. In response, the VADS component may increase the following distance driving parameter to account for the reaction time of a human driver, the failure rate of the older sensors in the vehicle 404, etc.

Figure 6:
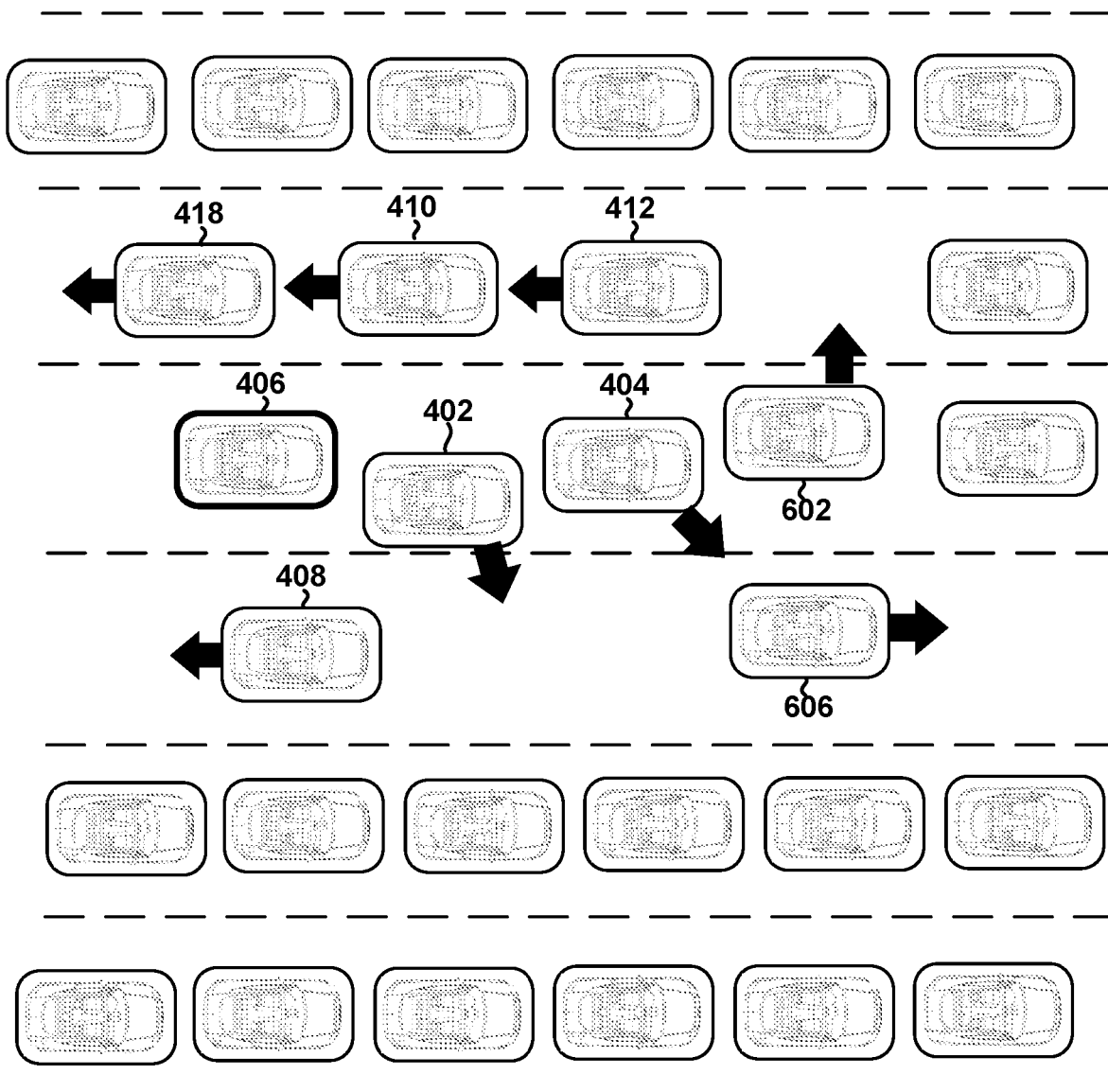
FIG. 6 is an illustration of a six-lane highway that includes autonomous connected vehicles that are configured to clear a path to allow another vehicle to pass them or exit the caravan.

FIG. 6 illustrates an example in which autonomous vehicles clear a path to allow another vehicle to pass the others or exit the caravan. With reference to FIGS. 1A-6, the VADS in autonomous vehicle 402 may generate and use an ACM to determine that that vehicle 406 is being manually operated by a human driver or otherwise does not have the required level of autonomy to follow at its current tailgating distance. In response, the VADS component may communicate with the other vehicles 404, 408, 410, 412, 418 to perform a coordinated maneuver in which the autonomous vehicles change lanes in order to allow the rear surrounding vehicle 406 to pass. Similarly, the vehicles 404, 408, 410, 412, 418 may communicate with their surrounding vehicles 602, 606 to perform additional coordinated maneuvers to allow them to change lanes and let the rear vehicle 406 pass.

As another example, autonomous vehicle 402 may receive a message from the rear vehicle 406 indicating that the driver of the vehicle 404 has requested to enter manual driving mode. In response, the autonomous vehicle 402 may communicate with the other vehicles 404, 408, 410, 412, 418 to perform a coordinated maneuver to clear a path that allows the vehicle 404 to begin exiting the caravan. The driver of the vehicle 404 may be given manual control after the path has been cleared and the vehicle 404 moved to a different lane.

Figure 7:
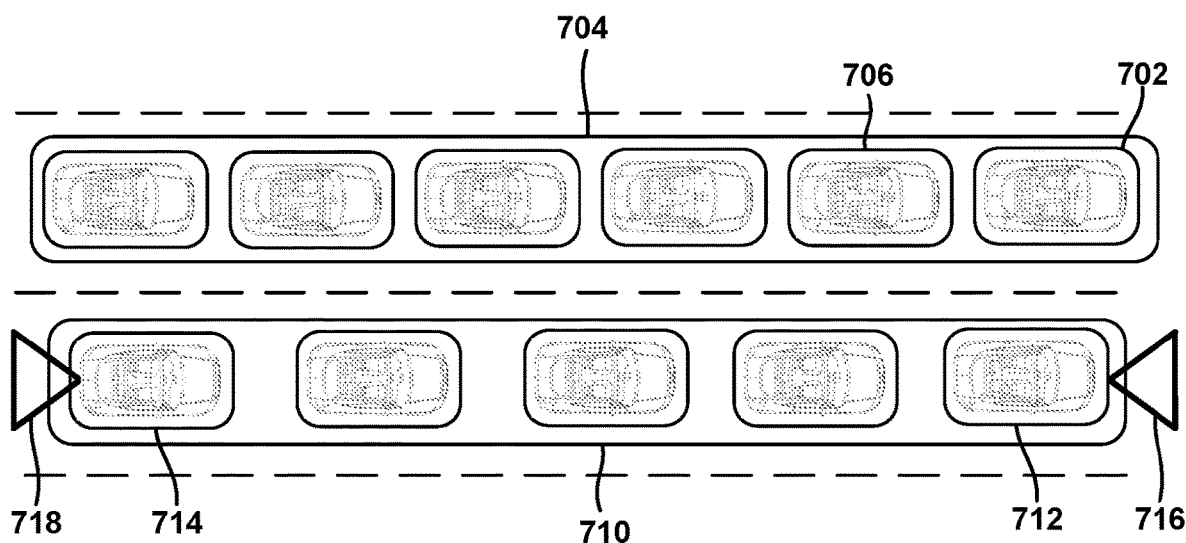
FIG. 7 is an illustration of a two-lane highway that includes autonomous connected vehicles that are configured to form a tightly-grouped caravans and engage in cooperative driving engagements.

FIG. 7 illustrates that the VADSs of the autonomous vehicles may be configured to allow groups of autonomous vehicles form a tightly-grouped caravans. The VADSs may be configured to leverage autonomous capabilities and sensor packages of nearby vehicles having higher levels of autonomy so as to increase the effective level of autonomy that can be achieved as a group and/or to benefit from shared computational resources, state estimation, etc.

With reference to FIGS. 1A-7, the lead vehicle 702 in the first caravan 704 has the highest levels of autonomy, and trailing vehicles 706 that are not capable of full autonomy on their own leverage the autonomous capabilities of the lead vehicle 702 to follow closely behind. The trailing vehicles 706 may reduce their perception and processing operations in order to save power. That is, the trailing vehicles 706 may simply follow the lead vehicle 702 and not use resources on longer range estimation, whereas the lead vehicle 702 may devote significant resources to long range estimation and prediction.

In some embodiments, vehicles in the second caravan 710 may be configured to share the perception and processing load in order to benefit from the capabilities of the group. Additionally, the vehicles could potentially focus their processing on certain regimes in order to make better use of the total computational resources of the team. For example, the lead vehicle 712 may focus on the area 716 ahead of the caravan, and the rear vehicle 714 may focus on the area 718 behind of the caravan. In some embodiments, autonomous vehicles may actively seek out these groups (e.g., first caravan 704, second caravan 710, etc.) in order to maximize power efficiency.

Figure 8:
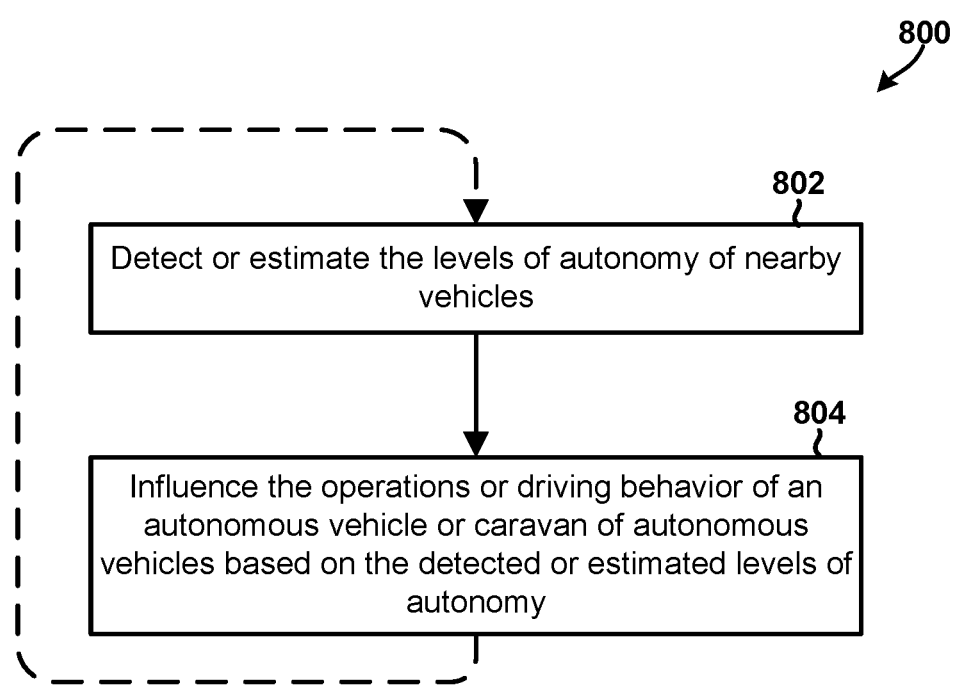
FIG. 8 is a process flow diagram illustrating a method of influencing the operations or driving behaviors of an autonomous vehicle (or a caravan of autonomous vehicles) based on the detected or estimated levels of autonomy in accordance with an embodiment.

FIG. 8 illustrates a method 800 of controlling an autonomous vehicle in accordance with an embodiment. With reference to FIGS. 1A-8, the method 800 may be performed by a control unit or processor (e.g., control unit 140, processors 164, 303, 304, 306, 307, 308, 317, processing device SOC 300, etc.) that includes or implements all or portions of a VADS in an autonomous vehicle. For ease of reference and to encompass all of the processors that may implement the method in various embodiments, the device performing operations of the method 800 is referred to in the following description as the "VADS component."

In block 802, the VADS component may detect or estimate the levels of autonomy of nearby vehicles. As described, the VADS component may determine the levels of each vehicle using any one or combination of methods. Non-limiting examples of such methods include receiving information regarding autonomy level from other vehicles via V2V communications, observing other vehicles and estimating a level of autonomy based upon observations of driving behaviors, looking up levels of autonomy in a database stored in memory or remotely via wireless access to the internet (e.g., using a vehicle identifier, make/model/year information, etc.), and combinations thereof. As described, the VADS component may generate an ACM value or vector of values reflecting the determined or estimated level of autonomy for each vehicle.

In block 804, the VADS component may influence the operations or driving behaviors of one or more autonomous vehicles (or a caravan of autonomous vehicles) based on the detected or estimated levels of autonomy.

The operations of blocks 802 and 804 may be performed continuously or repeatedly to control the operations of the autonomous vehicle. In some embodiments, the operations of the method 800 may be performed concurrently, in any order, and/or in conjunction with any or all of the operations discussed in the application, including the operations discussed with reference to FIGS. 4-7 and 9-14.

Figure 9A:
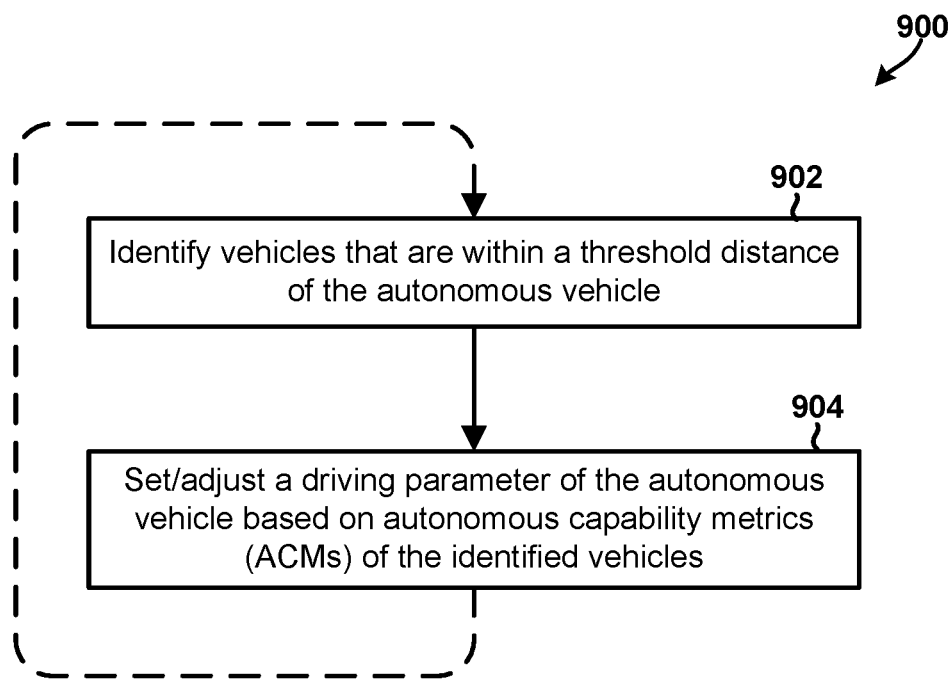
FIGS. 9A and 9B are process flow diagrams illustrating methods of adjusting behavior/operations of an autonomous vehicle based on the determined capabilities of the other surrounding vehicles in accordance with some embodiments.

FIG. 9A illustrates a method 900 of controlling an autonomous vehicle in accordance with another embodiment. With reference to FIGS. 1A-9A, the method 900 may be performed by a control unit or processor (e.g., control unit 140, processors 164, 303, 304, 306, 307, 308, 317, processing device SOC 300, etc.) that includes or implements all or portions of a VADS in an autonomous vehicle. For ease of reference and to encompass all of the processors that may implement the method in various embodiments, the device performing operations of the method 900 is referred to in the following description as the "VADS component."

In block 902, the VADS component may identify vehicles that are within a threshold distance of the autonomous vehicle. In some embodiments, the threshold distance may be a distance predetermined and stored in memory, such as a standard safe separation distance. In some embodiments, the threshold distance may be determined dynamically, such as by the VADS component based upon current conditions. In such embodiments, the operations in block 902 may include determining dynamically a threshold distance appropriate for current conditions; and identifying vehicles that are within the dynamically determined threshold distance.

In block 904, the VADS component may adjust a driving parameter of the autonomous vehicle based on ACMs of the identified vehicles. For example, the VADS component may use the ACM value or vectors of values determined in block 802 of the method 800 to adjust one or more driving parameters of the autonomous vehicle.

The operations of blocks 902 and 904 may be performed continuously or repeatedly to control the operations of the autonomous vehicle. The operations of the method 900 may be performed concurrently, in any order, and/or in conjunction with any or all of the operations discussed in the application, including the operations discussed with reference to FIGS. 4-8, 9B and 10-14.

Figure 9B:
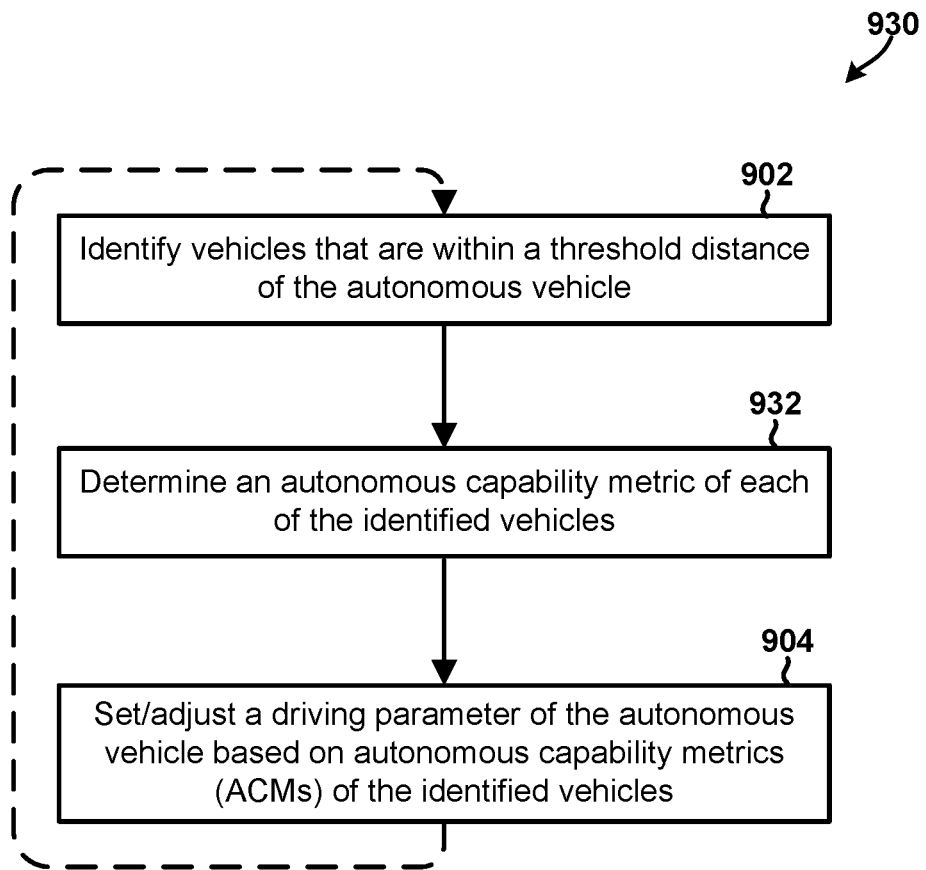

FIG. 9B illustrates a method 930 of controlling an autonomous vehicle in accordance with an embodiment. With reference to FIGS. 1A-9B, the method 930 may be performed by a control unit or processor (e.g., control unit 140, processors 164, 303, 304, 306, 307, 308, 317, processing device SOC 300, etc.) that includes or implements all or portions of a VADS in an autonomous vehicle. For ease of reference and to encompass all of the processors that may implement the method in various embodiments, the device performing operations of the method 930 is referred to in the following description as the "VADS component."

In block 902, the VADS component may perform the operations of the like numbered block of the method 900 as described. For example, in block 902, the VADS component may determine, dynamically, a threshold distance appropriate for current conditions and identify vehicles that are within the dynamically determined threshold distance.

In block 932, the VADS component may determine an autonomous capability metric (ACM) of each of the identified vehicles. In some embodiments, as part of the operations in block 932, the VADS component may determine a level of autonomy of each identified vehicle, such as whether the vehicle is in full autonomous mode, in semi-autonomous mode, or in manual mode (e.g., in manual mode with lane-following assist and/or vehicle separation assist engaged).

In some embodiments, in block 932, the VADS component may receive one or more of the ACMs from one or more of the identified vehicles. As such, in some embodiments, determining the ACM of each of the identified vehicles may include using an ACM received from at least one of the identified vehicles.

In some embodiments, in block 932, the VADS component may determine an ACM of an identified vehicle by determining one or more values that collectively identify or predict a level of autonomy or a performance capability of a nearby vehicle. In some embodiments, this may be accomplished by the VADS component observing driving behavior of the nearby vehicle, determining computing or sensor capability of the nearby vehicle, and/or receiving information regarding the nearby vehicle's rating or certifications via C-V2X communications in block 932.

In some embodiments, in block 932, the VADS component may determine one or more of the values that collectively identify or predict the level of autonomy or the performance capability of the nearby vehicle based on the observed driving behavior. In some embodiments, the value determined based on the observed driving behavior may represent the consistency, regularity or uniformity of vehicle operations, the level of predictability for future vehicle operations, the level of driver aggression, the degree to which the nearby vehicle tracks a center of a driving lane, the number of driving errors per unit time, compliance with local road rules, compliance with safety rules, the reaction time of the vehicle, responsiveness of the vehicle to observable events, or any combination thereof.

In some embodiments, in block 932, the VADS component may determine one or more of the values that collectively identify or predict the level of autonomy or the performance capability of the nearby vehicle based on the determined sensor capability. In some embodiments, the value determined based on the determined sensor capability may represent the sensor's type, the sensor's make, the sensor's model, the sensor's manufacturer, the number of autonomous driving sensors operating in the nearby vehicle, the sensor's accuracy, the precision of one or more sensors, or any combination thereof.

In some embodiments, in block 932, the VADS component may determine one or more of the values that collectively identify or predict the level of autonomy or the performance capability of the nearby vehicle based on information received via C-V2X communications. In some embodiments, the value determined based on information received via C-V2X communications may represent a KPI, the surface performance rating, the weather performance rating, a capability of the vehicle, a feature of the vehicle, a supported algorithm, a prediction and control strategy, or any combination thereof.

In block 904, the VADS component may perform the operations of the like numbered block of the method 900 as described. For example, in block 904, the VADS component may set or adjust a driving parameter of the autonomous vehicle based on the ACMs of the identified vehicles.

In some embodiments, adjusting the driving parameter in block 904 may include adjusting the minimum separation distance that is to be maintained between the autonomous vehicle and at least one of the identified vehicles. In some embodiments, the VADS component may adjust the minimum separation distance in block 904 based on the ACM of a vehicle and a behavior model of that vehicle.

In some embodiments, adjusting the driving parameter in block 904 may include adjusting the minimum following distance that is to be maintained between the autonomous vehicle and at least one of the identified vehicles. In some embodiments, the VADS component may adjust the minimum following distance in block 904 based on the ACM of a vehicle and a behavior model associated with that vehicle.

In some embodiments, the VADS component may adjust the driving parameter in block 904 by adjusting the speed of the vehicle or the acceleration rate at which the autonomous vehicle will change speed. In some embodiments, the VADS component may adjust the speed or acceleration rate in block 904 based on the ACM of a vehicle and a behavior model associated with that vehicle.

Figure 10:
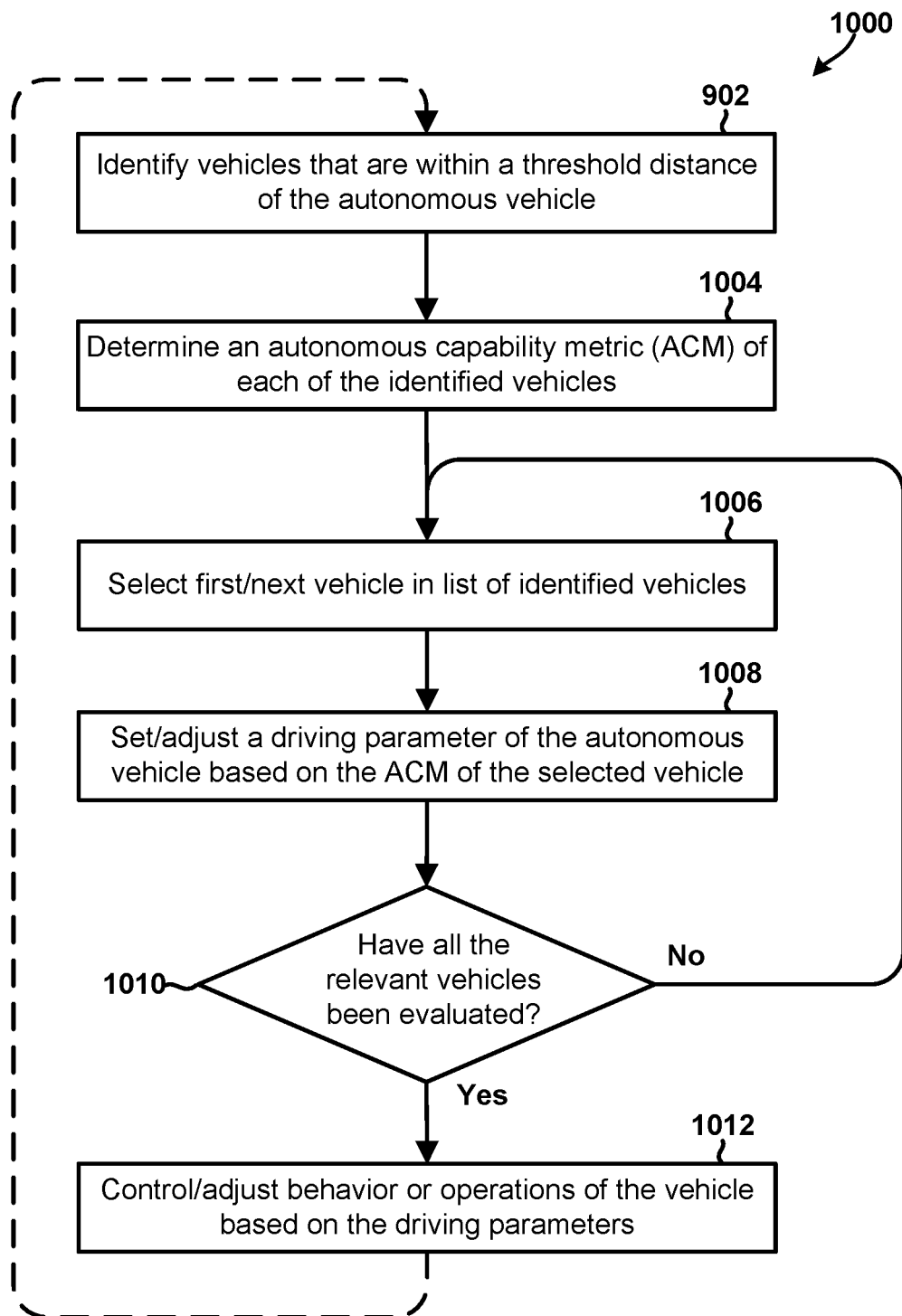
FIGS. 10 and 11 are process flow diagrams illustrating additional methods of adjusting behavior/operations of an autonomous vehicle based on the determined capabilities of the other surrounding vehicles in accordance with some embodiments.

FIG. 10 illustrates a method 1000 of controlling an autonomous vehicle in accordance with another embodiment. With reference to FIGS. 1A-10, the method 1000 may be performed by a control unit or processor (e.g., control unit 140, processors 164, 303, 304, 306, 307, 308, 317, processing device SOC 300, etc.) that includes or implements all or portions of a VADS in an autonomous vehicle. For ease of reference and to encompass all of the processors that may implement the method in various embodiments, the device performing operations of the method 1000 is referred to in the following description as the "VADS component."

In block 902, the VADS component may perform the operations of the like numbered block of the method 900 as described. For example, in block 902, the VADS component may identify vehicles that are within a threshold distance of the autonomous vehicle.

In block 1004, the VADS component may determine an ACM of each the identified vehicles, and populate a list of identified vehicles. As described, each ACM may include discrete or continuous values that collectively identify, estimate, or predict the precise level of autonomy and/or various capabilities of an identified vehicle. Each of the values in the ACM may represent a different aspect of a predicted, collected or observed feature, factor or data point associated with the identified vehicle. In some embodiments, the ACM may be a map, matrix or vector data structure that includes a plurality of symbols or numeric values that collectively characterize or represent the autonomous capabilities of the identified vehicle. The ACM data structure may be compared to various thresholds and/or applied to classifier models/decision nodes.

In block 1006, the VADS component may select a first vehicle in the list of identified vehicles. For example, the VADS component may sequentially traverse the list of identified vehicles and select the next vehicle in the list for adjustment, evaluation, comparison, modification, etc. In block 1008, the VADS component may perform the operations of block 904 of the method 900 as described. For example, in block 1008, the VADS component may set or adjust a driving parameter of the autonomous vehicle (e.g., by adjusting the minimum separation distance, minimum following distance, speed, acceleration rate, etc.) based on the ACM of the vehicle that was selected as part of the operations in block 1006.

In determination block 1010, the VADS component may determine whether all the relevant vehicles (e.g., 404-418) included in the list of identified vehicles have been evaluated or considered. For example, the VADS component may determine whether the currently selected vehicle is the last or final vehicle included in the list of identified vehicles.

In response to determining that all the relevant vehicles in the list of identified vehicles have not yet been evaluated or considered (i.e., determination block 1010="No"), the VADS component may select the next relevant vehicle in the list of identified vehicles in block 1006 and further adjust the driving parameters of the autonomous vehicle (if needed) based on the ACM of the selected vehicle in block 904.

The VADS component may perform the operations in blocks 1006, 904 and 1010 until all the relevant vehicles (e.g., front vehicle 404, rear vehicle 406, etc.) have been evaluated or considered.

In response to determining that all the relevant vehicles in the list of identified vehicles have been evaluated or considered (i.e., determination block 1010="Yes"), the VADS component may control or adjust the behavior or operations of the autonomous vehicle based on the driving parameters in block 1012. The operations of blocks 902, 904 and 1004-1012 may be performed continuously or repeatedly to control the operations of the autonomous vehicle.

The operations of the method 1000 may be performed concurrently, in any order, and/or in conjunction with any or all of the operations discussed in the application, including the operations discussed with reference to FIGS. 4-9, and 11-14. For example, in some embodiments, the VADS component may be configured to perform the operations in block 1012 each time it sets/adjusts a driving parameter in block 904, and prior to determining whether all the relevant vehicles have been evaluated or considered in determination block 1010.

Figure 11:
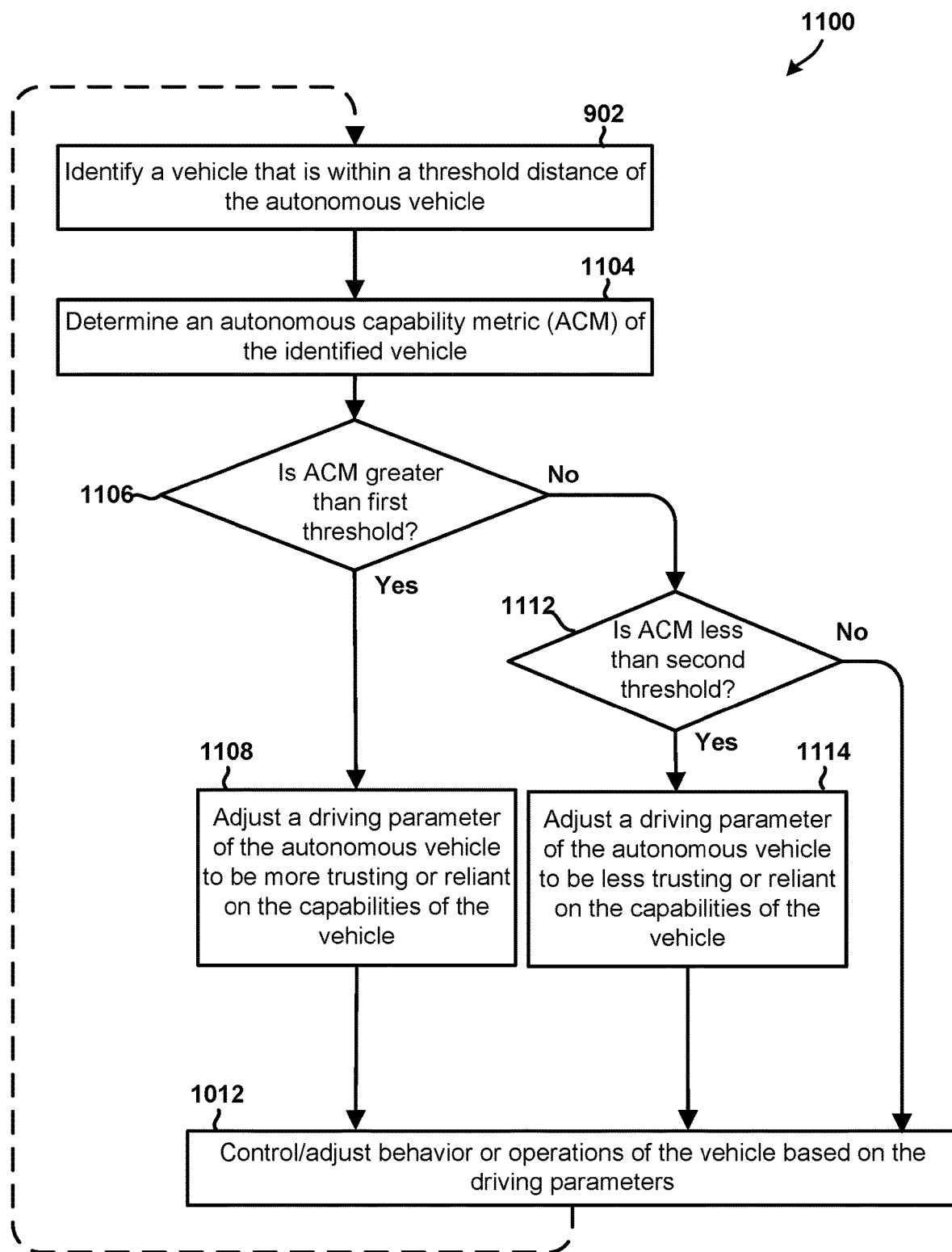

FIG. 11 illustrates a method 1100 of controlling an autonomous vehicle in accordance with another embodiment. With reference to FIGS. 1A-11, the method 1100 may be performed by a control unit or processor (e.g., control unit 140, processors 164, 303, 304, 306, 307, 308, 317, processing device SOC 300, etc.) that includes or implements all or portions of a VADS in an autonomous vehicle. For ease of reference and to encompass all of the processors that may implement the method in various embodiments, the device performing operations of the method 1100 is referred to in the following description as the "VADS component."

In block 902, the VADS component may perform the operations of the like numbered block of the method 900 as described. For example, in block 902, the VADS component may identify vehicles that are within a threshold distance of the autonomous vehicle. In block 1104, the VADS component may determine an ACM of an identified vehicle. The ACM may identify the level of autonomy of a vehicle that is in front of the autonomous vehicle. In some embodiments, the ACM may include a discrete or finite value that identifies, estimates, or predicts the autonomous capability of the vehicle that is in front of the autonomous vehicle. In other embodiments, the ACM may include many values that each represent a different aspect of a predicted, collected or observed feature, factor or data point associated with the vehicle that is in front of the autonomous vehicle.

In determination block 1106, the VADS component may determine whether the ACM (e.g., level of autonomy) exceeds or is greater than a first threshold. The first threshold may include or represent a single value (e.g., autonomous driving level 4.376, etc.) or many values. In an embodiment, the first threshold may include decision nodes that each test or evaluate a different feature, factor or data point (e.g., V2V communication circuitry present, LIDAR sensor accuracy range is greater than 100 meters, all brake pads include at least 5 mm of friction material, etc.).

In response to determining that the ACM exceeds or is greater than a first threshold (i.e., determination block 1106="Yes"), the VADS component may adjust a driving parameter of the autonomous vehicle so that the vehicle is more trusting or reliant on the capabilities of the vehicle in block 1108. For example, the VADS component may lower a following distance parameter in block 1108 in response to determining that the vehicle immediately in front of the autonomous vehicle has a high level of autonomy, powerful sensors, an advanced autonomous control system, etc. In block 1012, the VADS component may adjust the behavior or operations of the autonomous vehicle based on the driving parameters.

In response to determining that the ACM is not greater than a first threshold (i.e., determination block 1106="No"), the VADS component may determine whether the ACM exceeds or is less than a second threshold value in determination block 1112.

In response to determining that the ACM is less than the second threshold value (i.e., determination block 1112="Yes"), the VADS component may adjust a driving parameter of the autonomous vehicle so that the vehicle less trusting or reliant on the capabilities of the vehicle in block 1114. For example, the VADS component may increase a following distance parameter in block 1108 in response to determining that the vehicle immediately in front of the autonomous vehicle is an older vehicle that does not include sophisticated sensors or an advanced autonomous control system. In block 1012, the VADS component may adjust the behavior or operations of the autonomous vehicle based on the driving parameters.

In response to determining that the ACM is not less than a first threshold (i.e., determination block 1112="No"), the VADS component may control the behavior or operations of the autonomous vehicle based on the driving parameters in block 1012.

The operations of the method 1100 may be performed continuously or repeatedly to control the operations of the autonomous vehicle. The operations of the method 1100 may be performed concurrently, in any order, and/or in conjunction with any or all of the operations discussed in the application, including the operations discussed with reference to FIGS. 4-10 and 12-14.

Figure 12A:
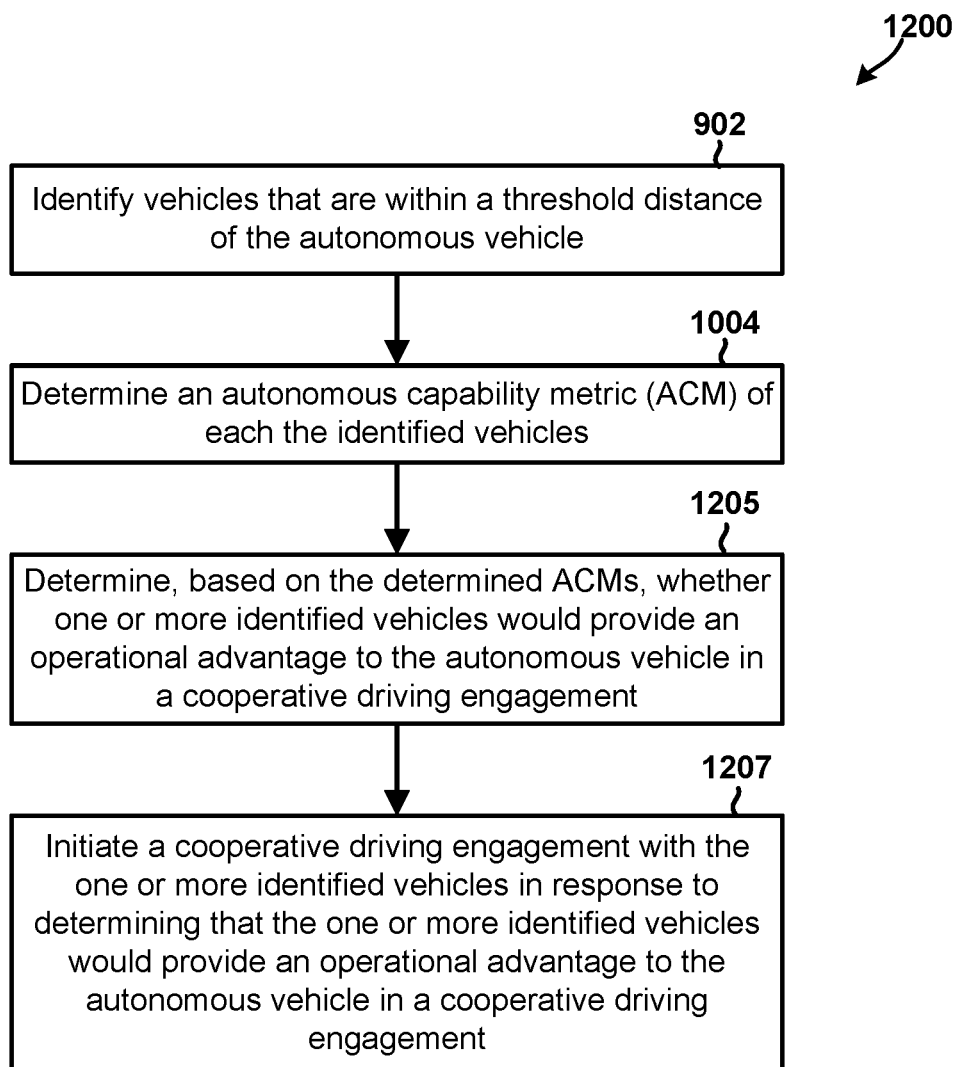
FIGS. 12A and 12B are process flow diagrams illustrating methods of initiating a cooperative driving engagement with another vehicle in response to determining that the vehicle would provide an operational advantage to the autonomous vehicle in accordance with some embodiments.

FIG. 12A illustrates a method 1200 of controlling an autonomous vehicle in accordance with another embodiment. With reference to FIGS. 1A-12A, the method 1200 may be performed by a control unit or processor (e.g., control unit 140, processors 164, 303, 304, 306, 307, 308, 317, processing device SOC 300, etc.) that includes or implements all or portions of a VADS in an autonomous vehicle. For ease of reference and to encompass all of the processors that may implement the method in various embodiments, the device performing operations of the method 1200 is referred to in the following description as the "VADS component."

In block 902, the VADS component may perform the operations of the like numbered block of the method 900 as described. For example, in block 902, the VADS component may identify vehicles that are within a threshold distance of the autonomous vehicle.

In block 1004, the VADS component may perform the operations of the like numbered block of the method 1000 as described. For example, in block 1004, the VADS component may determine an autonomous capability metric (ACM) of each the identified vehicles. In some embodiments, the VADS component may generate vector or matrix of values that collectively identify or predict a level of autonomy or a performance capability of the identified vehicles in block 1004, and determine the ACMs of the identified vehicles based on generated vector or matrix of values.

In block 1205, the VADS component may determine, based on the determined ACMs, whether one or more identified vehicles would provide an operational advantage to the autonomous vehicle in a cooperative driving engagement (e.g., operating the autonomous vehicle in a caravan with an identified vehicle, communicating sensor data with another vehicles, etc.). For example, the VADS component may use V2V communications to determine the destination or planned travel route of an identified vehicle, determine a duration that the identified vehicle will be traveling along a route consistent with a destination of the autonomous vehicle, and determine whether there would be an operational advantage to engaging in a cooperative driving arrangement (e.g., sharing sensor data or forming a caravan) in response to determining that the identified vehicle will be traveling in a same or similar direction as the autonomous vehicle for at least a threshold period of time.

In some embodiments, as part of the operations in block 1205, the VADS component may communicate with at least one of the identified vehicles to determine a destination or planned travel route of that identified vehicle, compare the destination or planned travel route to a destination of the autonomous vehicle, determine a duration that the one or more identified vehicles will be traveling along a route consistent with the destination of the autonomous vehicle, and compare the determined duration to the threshold period of time determine whether there would be an operational advantage to engaging in a cooperative driving arrangement (e.g., sharing sensor data or forming a caravan) based on whether the determined duration exceeds the threshold period of time.

In some embodiments, in block 1205 the VADS component may determine whether one or more sensors of an identified vehicle would provide a sensor capability not possessed by the autonomous vehicle that would be beneficial for safety or operational performance of the autonomous vehicle. In some embodiments, in block 1205 the VADS component may determine whether a level of autonomy of the identified vehicle would enable the autonomous vehicle to operate more safely or with improved performance in the cooperative driving engagement.

In some embodiments, in block 1205 the VADS component may determine, based on the determined ACMs, whether at least one of the identified vehicles would provide an operational advantage to the autonomous vehicle in a cooperative driving engagement takes into consideration a driving condition including at least one of a roadway condition, a weather condition, a type of roadway, a level of vehicle traffic on the roadway, a speed limit of the roadway, a hazard or obstacle along the roadway, or a lighting condition.

In block 1207, the VADS component may initiate a cooperative driving engagement with the one or more identified vehicles in response to determining that the one or more identified vehicles would provide an operational advantage to the autonomous vehicle in a cooperative driving engagement. That is, in response to determining that there would be an operational advantage to engaging in a cooperative driving arrangement, the VADS component may initiate a cooperative driving engagement in which the autonomous vehicle shares sensor data with the identified vehicle(s) and/or drives in a particular location relative to the identified other vehicle(s) so as to best leverage the sensors of each vehicle. For example, the autonomous vehicle and the identified other vehicle(s) may coordinate to position the vehicle with the best forward looking sensor in the lead of a caravan.

In some embodiments, in block 1207, the VADS component may determine whether the one or more identified vehicles will be traveling in a same or similar direction as the autonomous vehicle for a threshold period of time in response to determining that one or more identified vehicles would provide an operational advantage to the autonomous vehicle in a cooperative driving engagement, and initiate the cooperative driving engagement with the one or more identified vehicles in response to determining that the one or more identified vehicles will be traveling in a same or similar direction as the autonomous vehicle for the threshold period of time.

In some embodiments, in block 1207, the VADS component may send a communication message to the one or more identified vehicles to request that the one or more identified vehicles participate in the cooperative driving engagement, receive a confirmation message indicating the one or more identified vehicles will participate in the cooperative driving engagement, establish direct communication links to the one or more identified vehicles in response to receiving the confirmation message indicating the one or more identified vehicles will participate in the cooperative driving engagement, receive information from the one or more identified vehicles via the direct communication links, and adjust a driving parameter of the autonomous vehicle based on the information received from the one or more identified vehicles.

Figure 12B:
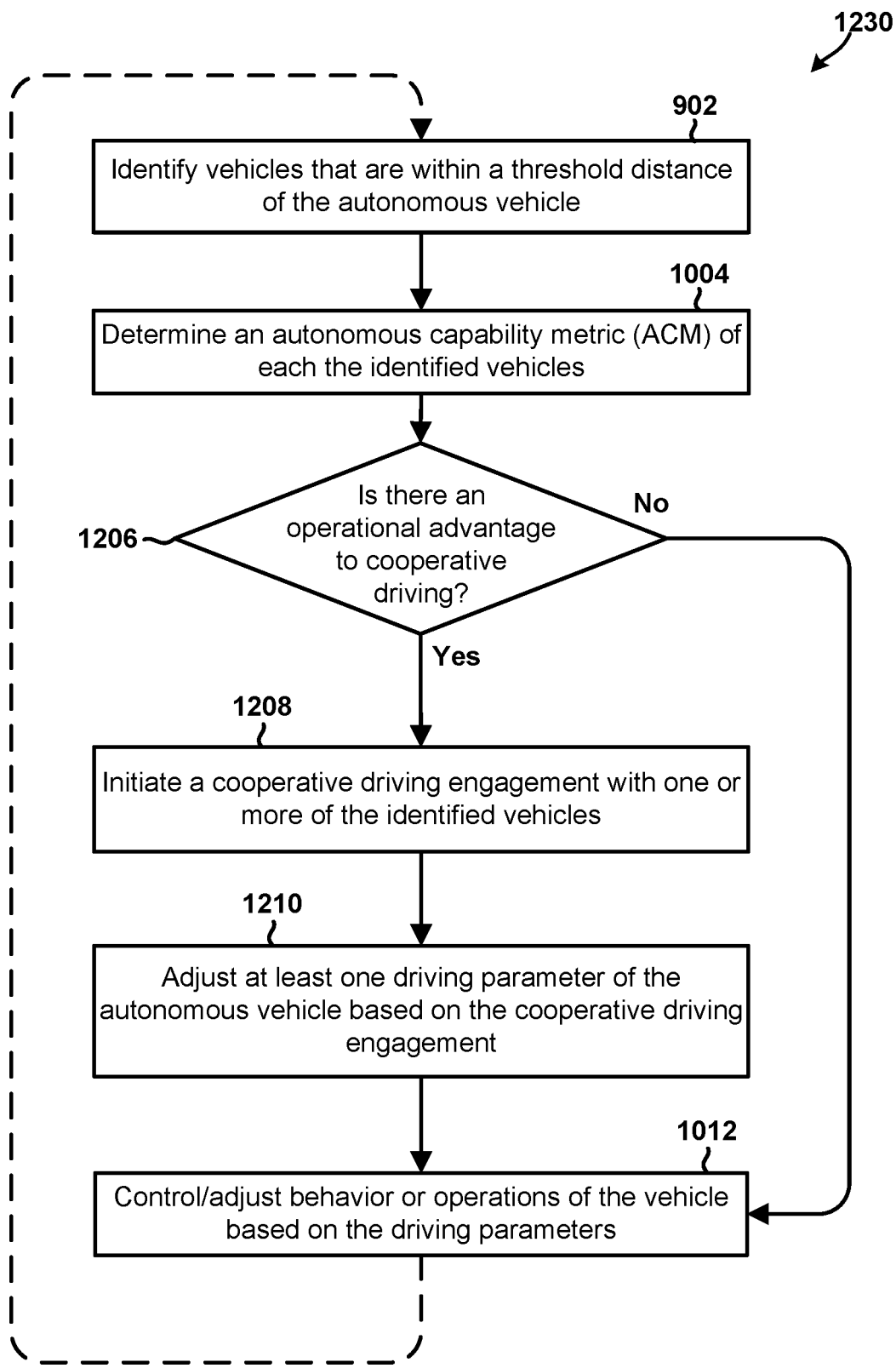

FIG. 12B illustrates a method 1230 of controlling an autonomous vehicle in accordance with another embodiment. With reference to FIGS. 1A-12B, the method 1230 may be performed by a control unit or processor (e.g., control unit 140, processors 164, 303, 304, 306, 307, 308, 317, processing device SOC 300, etc.) that includes or implements all or portions of a VADS in an autonomous vehicle. For ease of reference and to encompass all of the processors that may implement the method in various embodiments, the device performing operations of the method 1230 is referred to in the following description as the "VADS component."

In block 902, the VADS component may perform the operations of the like numbered block of the method 900 as described. For example, in block 902, the VADS component may identify vehicles that are within a threshold distance of the autonomous vehicle.

In block 1004, the VADS component may perform the operations of the like numbered block of the method 1000 as described. For example, in block 902, the VADS component may determine an autonomous capability metric (ACM) for each the identified vehicles.

In determination block 1206, the VADS component may use the ACMs to determine whether any of identified vehicles would provide an operational advantage to the autonomous vehicle if it were to engage in a cooperative driving engagement (e.g., operating the autonomous vehicle in a platoon with one or more of other vehicles, communicating sensor data with other vehicles, etc.). For example, the VADS component may use V2V communications to determine the destination or planned travel route of an identified vehicle, determine a duration that the identified vehicle will be traveling along a route consistent with a destination of the autonomous vehicle, and determine that there would be an operational advantage to engaging in a cooperative driving engagement in response to determining that the identified vehicle will be traveling in a same or similar direction as the autonomous vehicle for at least a threshold period of time.

In some embodiments, the VADS component may be configured to determine that there would be an operational advantage in determination block 1206 in response to determining that a sensor in an identified vehicle would provide a sensor capability that is not possessed by the autonomous vehicle, and that the sensor capability would be beneficial for safety or operational performance of the autonomous vehicle. In some embodiments, the VADS component may determine that there would be an operational advantage in determination block 1206 based on the determined autonomy level of an identified vehicle, such as based on whether the identified vehicle is highly autonomous and includes premium sensors that would enable the autonomous vehicle to operate more safely or with improved performance. In some embodiments, the VADS component may be configured to determine whether there would be an operational advantage in determination block 1206 based on driving conditions, such as a roadway condition, a weather condition, a type of roadway, a level of vehicle traffic on the roadway, a speed limit of the roadway, hazards or obstacles along the roadway, lighting conditions, etc. In some embodiments, the VADS component may be configured to determine that there would be an operational advantage to engaging in the cooperative driving engagement based on a combination of driving conditions and ACMs of surrounding vehicles.

In response to determining that none of the identified vehicles would provide an operational advantage to the autonomous vehicle if it were to engage in a cooperative driving engagement with them (i.e., determination block 1206="No"), the VADS component may control the behavior or operations of the autonomous vehicle based on the existing driving parameters in block 1012.

In response to determining that at least one of identified vehicles would provide an operational advantage to the autonomous vehicle if it were to engage in a cooperative driving engagement (i.e., determination block 1206="Yes"), the VADS component may initiate a cooperative driving engagement with at least one of the identified vehicles in block 1208. For example, the VADS component may set the driving parameters in block 1208 so that the autonomous vehicle follows the identified vehicle (or otherwise leverages the sensors of an identified vehicle) for a determined duration. In block 1012, the VADS component may control or adjust the behavior or operations of the autonomous vehicle based on the driving parameters.

The operations of the method 1200 may be performed continuously or repeatedly to control the operations of the autonomous vehicle. The operations of the method 1200 may be performed concurrently, in any order, and/or in conjunction with any or all of the operations discussed in the application, including the operations discussed with reference to FIGS. 4-11, 13 and 14.

Figure 13:
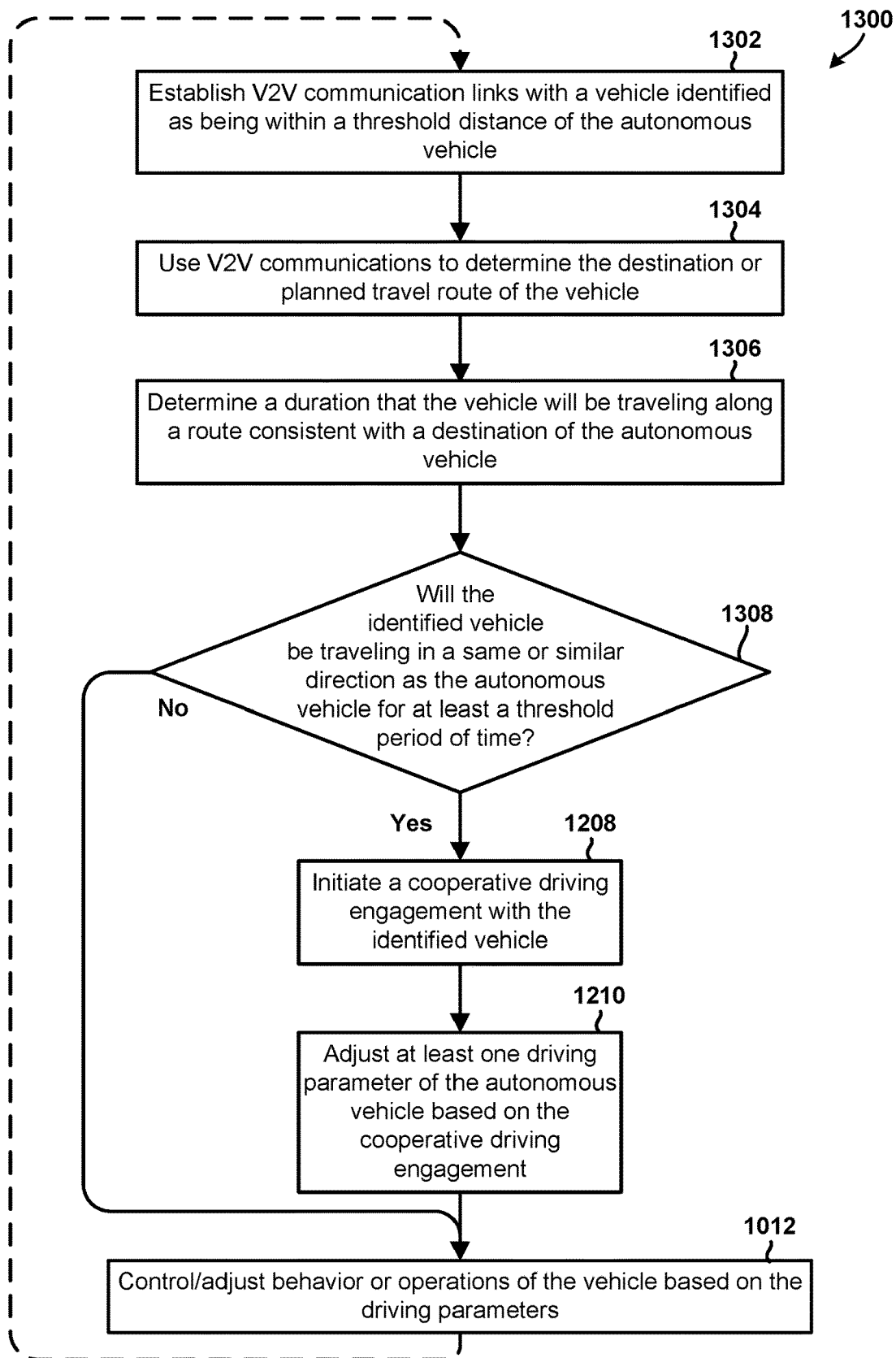
FIG. 13 is a process flow diagram illustrating a method of determining whether an identified vehicle would provide an operational advantage to the autonomous vehicle if it were to engage in a cooperative driving engagement in accordance with an embodiment.

FIG. 13 illustrates a method 1300 of determining whether any of identified vehicles would provide an operational advantage to the autonomous vehicle if it were to engage in a cooperative driving engagement in accordance with another embodiment. With reference to FIGS. 1A-13, the method 1300 may be performed by a control unit or processor (e.g., control unit 140, processors 164, 303, 304, 306, 307, 308, 317, processing device SOC 300, etc.) that includes or implements all or portions of a VADS in an autonomous vehicle. For ease of reference and to encompass all of the processors that may implement the method in various embodiments, the device performing operations of the method 1300 is referred to in the following description as the "VADS component."

In block 1302, the VADS component may perform various operations to establish V2V communication links with a vehicle identified as being within a threshold distance of the autonomous vehicle.

In block 1304, the VADS component may use V2V communication to determine the destination or planned travel route of the identified vehicle. For example, the VADS component may transmit a request to other vehicles via V2V communications for each vehicle to reply with its destination or similar information.

In block 1306, the VADS component may determine a duration that the vehicle will be traveling along a route consistent with a destination of the autonomous vehicle. In some embodiments, this may be accomplished by using map data in combination with own vehicle travel plans to determine a distance that the autonomous vehicle and the other vehicle will or could travel the same roadway at the same speed. As part of this operation, the VADS component may evaluate altering its own travel plan to follow the other vehicle along a path or route that will not delay arrival more than a threshold amount of time.

In determination block 1308, the VADS component may determine whether the identified vehicle will be traveling in a same or similar direction as the autonomous vehicle for at least a threshold period of time. The threshold period of time may be a duration or distance that is sufficient to realize a net benefit from a cooperative driving engagement. The threshold period of time may vary based upon the type of engagement. For example, if the cooperative driving engagement will involve only sharing of sensor data among the cooperating vehicles, the threshold period of time may a matter of a minute or less as the impact on vehicle movements and degree of coordination may be minimal. As another example, if the cooperative driving engagement involves forming a dense-packed caravan among the cooperating vehicles, the threshold period of time may a matter of 30 minutes or hours as forming such a caravan involves significant maneuvering among the vehicles that may take several minutes to accomplish.

In response to determining that the identified vehicle will not be traveling in a same or similar direction as the autonomous vehicle for at least the threshold period of time (i.e., determination block 1308="No"), the VADS component may continue to control the behavior or operations of the autonomous vehicle based on the existing driving parameters in block 1012.

In response to determining that the identified vehicle will be traveling in the same or similar direction as the autonomous vehicle for at least the threshold period of time (i.e., determination block 1308="Yes"), the VADS component may the VADS component may perform the operations of block 1208 of the method 1230 as described. For example, in block 1208, the VADS component may determine that the identified vehicle would provide an operational advantage to the autonomous vehicle if it were to engage in a cooperative driving engagement, and initiate the cooperative driving engagement.

In block 1210, the VADS component may perform the operations of the like numbered block of the method 1230 as described. For example, in block 1210, the VADS component may adjust the driving parameters of the autonomous vehicle based on the cooperative driving engagement. For example, the VADS component may set the driving parameters in block 1210 so that the autonomous vehicle follows the identified vehicle (or otherwise leverages the sensors of an identified vehicle) for a determined duration. In block 1012, the VADS component may control or adjust the behavior or operations of the autonomous vehicle based on the driving parameters.

The operations of the method 1300 may be performed continuously or repeatedly to control the operations of the autonomous vehicle. The operations of the method 1300 may be performed concurrently, in any order, and/or in conjunction with any or all of the operations discussed in the application, including the operations discussed with reference to FIGS. 4-12 and 14.

Figure 14:
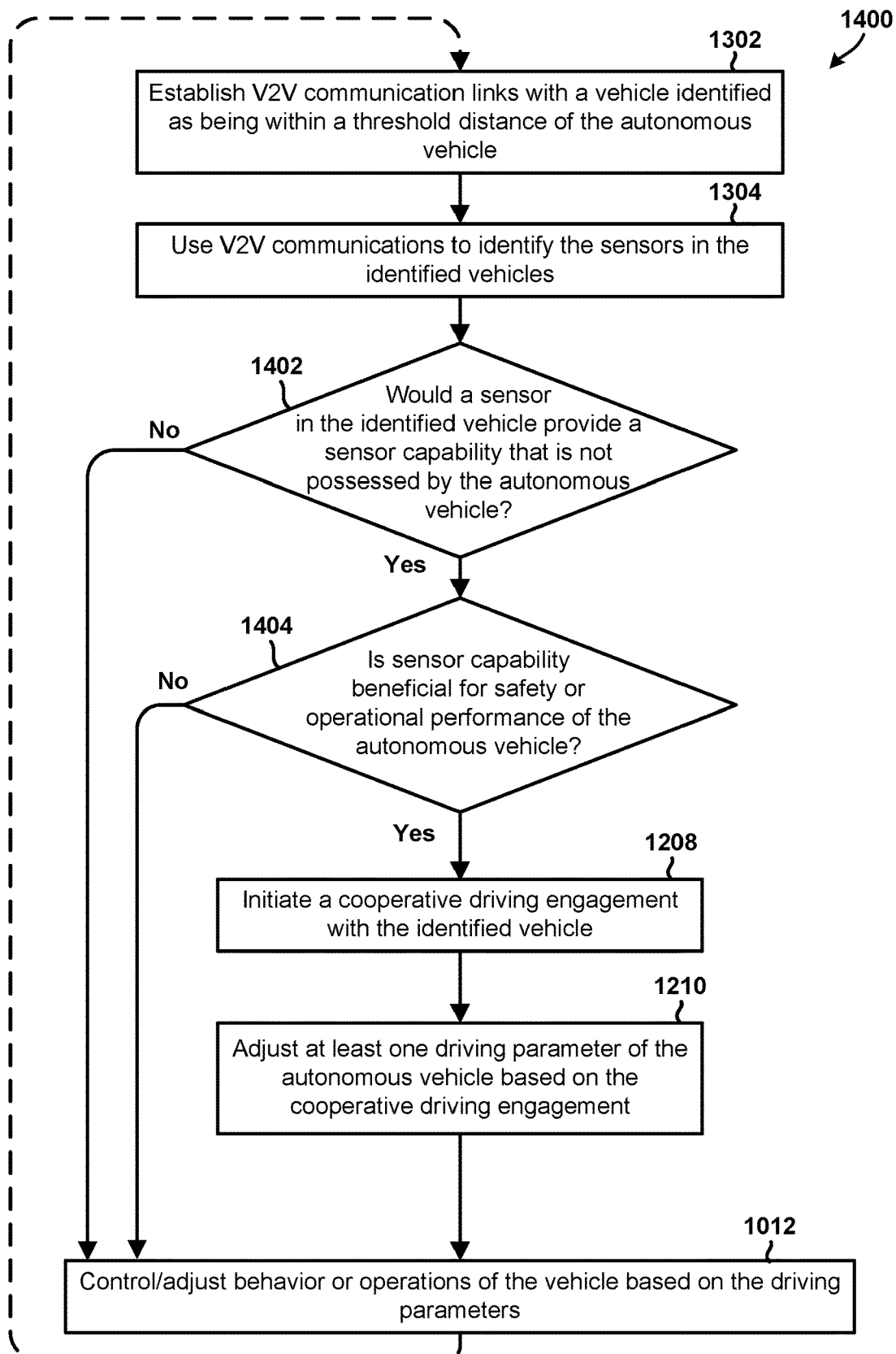
FIG. 14 is a process flow diagram illustrating a method of determining whether an identified vehicle would provide an operational advantage to the autonomous vehicle if it were to engage in a cooperative driving engagement in accordance with an embodiment.

FIG. 14 illustrates a method 1400 of determining whether any of identified vehicles would provide an operational advantage to the autonomous vehicle if it were to engage in a cooperative driving engagement in accordance with another embodiment. With reference to FIGS. 1A-14, the method 1400 may be performed by a control unit or processor (e.g., control unit 140, processors 164, 303, 304, 306, 307, 308, 317, processing device SOC 300, etc.) that includes or implements all or portions of a VADS in an autonomous vehicle. For ease of reference and to encompass all of the processors that may implement the method in various embodiments, the device performing operations of the method 1400 is referred to in the following description as the "VADS component."

In blocks 1302 and 1304, the VADS component may perform the operations of the like numbered blocks of the method 1300 as described. For example, in block 1302, the VADS component may perform various operations to establish V2V communication links with a vehicle identified as being within a threshold distance of the autonomous vehicle, and in block 1304, the VADS component may use V2V communication to determine the destination or planned travel route of the identified vehicle.

In determination block 1402, the VADS component may determine whether a sensor in the identified vehicle could provide the autonomous vehicle with a sensor capability that is better than the sensor capability of the autonomous vehicle, such as a sensor that is not currently possessed by the autonomous vehicle.

In response to determining that a sensor in the identified vehicle could provide the autonomous vehicle with a sensor capability that is better than the sensor capability of the autonomous vehicle (i.e., determination block 1402="Yes"), the VADS component may determine whether the sensor capability in the identified vehicle is beneficial to the safety or operational performance of the autonomous vehicle in determination block 1404.

In response to determining that the sensor capability in the identified vehicle is beneficial to the safety or operational performance of the autonomous vehicle (i.e., determination block 1404="Yes"), the VADS component may the VADS component may determine that the identified vehicle would provide an operational advantage to the autonomous vehicle if it were to engage in a cooperative driving engagement and, in response, perform the operations in blocks 1208, 1210 and 102 as described.

In response to determining that none of the sensors in the identified vehicle is better than the sensor capabilities of the autonomous vehicle (i.e., determination block 1402="No") or that the sensor capability is not beneficial to the safety or operational performance of the autonomous vehicle (i.e., determination block 1404="No"), the VADS component may perform the operations of block 101 of the method 1000 as described. For example, in block 1012, the VADS component may continue to control the behavior or operations of the autonomous vehicle based on the existing driving parameters 2.

The operations of the method 1400 may be performed continuously or repeatedly to control the operations of the autonomous vehicle. The operations of the method 1400 may be performed concurrently, in any order, and/or in conjunction with any or all of the operations discussed in the application, including the operations discussed with reference to FIGS. 4-13.

Figure 15:
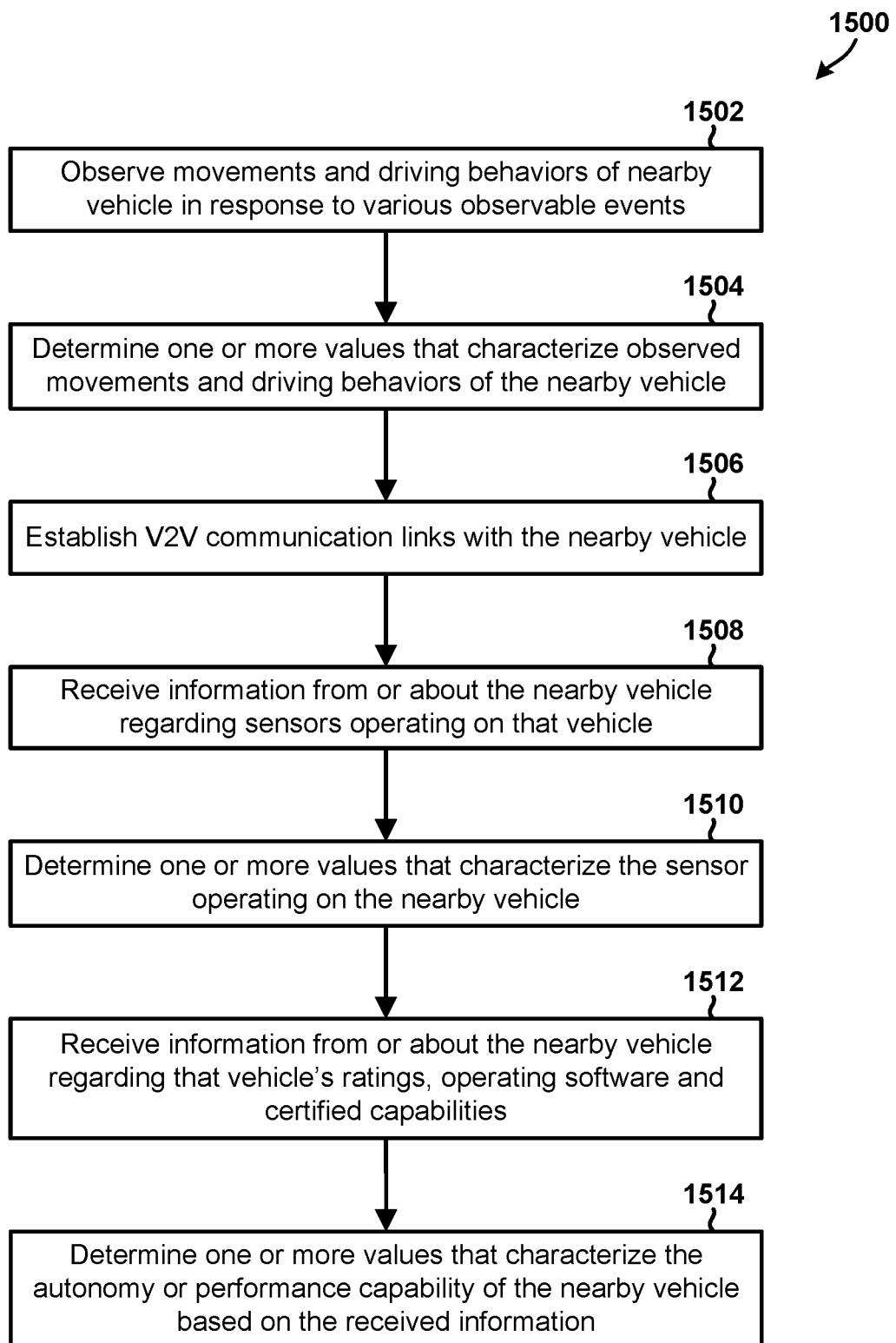
FIG. 15 is a process flow diagram illustrating a method of determining a level of autonomy or performance of a nearby vehicle in accordance with an embodiment.

FIG. 15 illustrates a method 1500 of determining values for an ACM for a nearby vehicle in accordance with some embodiments. With reference to FIGS. 1A-15, the method 1500 may be performed by a control unit or processor (e.g., control unit 140, processors 164, 303, 304, 306, 307, 308, 317, processing device SOC 300, etc.) that includes or implements all or portions of a VADS in an autonomous vehicle. For ease of reference and to encompass all of the processors that may implement the method in various embodiments, the device performing operations of the method 1500 is referred to in the following description as the "VADS component." Further, some or all of the operations of the method 1500 may be performed as part of the operations in any of block 802 of the method 800, block 1004 of the methods 1000 and 1200, and/or block 1104 of the method 1100 as described.

In overview, a VADS component of an autonomous vehicle may determine values for an ACM for a nearby vehicle that collectively identify or predict the level of autonomy or the performance capability of that vehicle by observing driving behavior of the nearby vehicle, determining computing or sensor capability of the nearby vehicle, and/or receiving information regarding the nearby vehicle's rating or certifications via C-V2X communications.

More specifically, in block 1502, the VADS component may observe movements and driving behaviors of nearby vehicle in response to various observable events. This may involve processing imaging, LIDAR and other sensor data to identify vehicle movements and responses to observed events (e.g., brake lights, changes in traffic flow or speed, traffic signals, etc.) Such observations may continue over time so that trends and frequencies of actions (e.g., number of driving errors or sudden steering of velocity adjustments per unit time) can be analyzed.

In block 1504, the VADS component may use the observations to determining one or more values that characterize observed movements and driving behaviors of the nearby vehicle. Examples of driving behaviors that may be summarized or quantified in ACM values include one or more of: a consistency, regularity or uniformity of vehicle operations; a level of predictability for future vehicle operations; a level of driver aggression; a degree to which the nearby vehicle tracks a center of a driving lane; number of driving errors per unit time; compliance with local road rules; compliance with safety rules; reaction time of the vehicle; and/or responsiveness of the vehicle to observable events.

In block 1506, the VADS component may establish V2V communication links with the nearby vehicle, or in some embodiments with a remote server that stores information regarding the nearby vehicle, and receive information from or about the nearby vehicle regarding sensors operating on that vehicle in block 1508. The type of information about the nearby vehicle's operating sensor may include, for example, a sensor type, the make, model or manufacturer of one or more sensors, the number of autonomous driving sensors operating in the nearby vehicle, sensor accuracy, and/or precision of one or more sensors. Such information may reveal the capabilities, weaknesses, and reliability of the sensors in the nearby vehicle. Such information may be received directly from the nearby vehicle, such as in response to a query both transmitted via a V2V communication link. Alternatively or additionally, such information may be received from a remote source, such as a remote server accessed through the internet via wireless communications.

In block 1510, the VADS component may determine one or more values that characterize the sensor operating on the nearby vehicle. For example, the VADS component may determine ACM values representing one or more of a sensor type, a sensor make or model, a sensor manufacturer, the number of autonomous driving sensors operating in the nearby vehicle, sensor accuracy, and/or precision of one or more sensors.

In block 1512, the VADS component may receive information from or about the nearby vehicle regarding that vehicle's ratings, operating software and certified capabilities. Such information may be received directly from the nearby vehicle, such as in response to a query both transmitted via a V2V communication link. Alternatively or additionally, such information may be received from a remote source, such as a remote server accessed through the internet via wireless communications. Examples of ratings and certified information regarding the nearby vehicle include: a key performance indicator (KPI); a surface performance rating; a weather performance rating; a vehicle capability; a vehicle feature; a supported algorithm; and/or a prediction and control strategy.

In block 1514, the VADS component may determine one or more values that characterize the autonomy or performance capability of the nearby vehicle based on the received ratings and/or certificate information. The determined values may represent one or more of: a key performance indicator (KPI); a surface performance rating; a weather performance rating; a vehicle capability; a vehicle feature; a supported algorithm; and/or a prediction and control strategy.

In some embodiments, only some of the operations in the method 1500 may be performed. For example, a VADS component may determine ACM values based solely on observed driving behaviors (i.e., only performing operations in blocks 1502 and 1504. As another example, a VADS component may determine ACM values based on observed driving behaviors in combination with information regarding the ratings and/or certifications of the nearby vehicle (i.e., only performing operations in blocks 1502-1506 and 1512-1514). Further, the method 1500 may be performed for each identified nearby vehicle, and may be performed continuously or periodically to update ACM values, such as based on observations of driving behaviors.

The foregoing method descriptions and the process flow diagrams are provided merely as illustrative examples and are not intended to require or imply that the blocks of the various aspects must be performed in the order presented. As will be appreciated by one of skill in the art the order of blocks in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the aspects disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of controlling an autonomous vehicle, comprising:
    identifying, via a processor of the autonomous vehicle, vehicles that are within a threshold distance of the autonomous vehicle;
    determining an autonomous capability metric (ACM) for each of the identified vehicles;
    determining, based on the determined ACMs, whether one or more of the identified vehicles would provide an operational advantage to the autonomous vehicle in a cooperative driving engagement; and
    initiating the cooperative driving engagement with the one or more identified vehicles in response to determining that the one or more identified vehicles would provide the operational advantage to the autonomous vehicle in the cooperative driving engagement, wherein initiating the cooperative driving engagement includes adjusting one or more driving parameters of the autonomous vehicle to position the autonomous vehicle relative to the one or more identified vehicles so as to leverage sensors of each of the one or more identified vehicles.

2. The method of claim 1, wherein initiating the cooperative driving engagement with the one or more identified vehicles in response to determining that the one or more identified vehicles would provide the operational advantage to the autonomous vehicle in the cooperative driving engagement comprises:
    determining whether the one or more identified vehicles will be traveling in a same or similar direction as the autonomous vehicle far a threshold period of time in response to determining that the one or more identified vehicles would provide the operational advantage to the autonomous vehicle in the cooperative driving engagement, and
    initiating the cooperative driving engagement with the one or more identified vehicles in response to determining that the one or more identified vehicles will be traveling in the same or similar direction as the autonomous vehicle for the threshold period of time.

3. The method of claim 2, wherein determining whether the one or more identified vehicles will be traveling in the same or similar direction as the autonomous vehicle for the threshold period of time comprises:
    communicating with the one or more identified vehicles to determine a destination or planned travel route of the one or more identified vehicles;
    comparing the destination or planned travel route of the one or more identified vehicles to a destination of the autonomous vehicle;
    determining a duration that the one or more identified vehicles will be traveling along a route consistent with the destination of the autonomous vehicle; and
    comparing the determined duration to the threshold period of time.

4. The method of claim 1, wherein initiating the cooperative driving engagement with the one or more identified vehicles further comprises:
    sending a communication message to the one or more identified vehicles to request that the one or more identified vehicles participate in the cooperative driving engagement;
    receiving a confirmation message indicating the one or more identified vehicles will participate in the cooperative driving engagement;
    establishing direct communication links to the one or more identified vehicles in response to receiving the confirmation message indicating the one or more identified vehicles will participate in the cooperative driving engagement;
    receiving information from the one or more identified vehicles via the direct communication links; and
    adjusting one or more of the driving parameters of the autonomous vehicle based on information received from the one or more identified vehicles.

5. The method of claim 1, wherein determining, based on the determined ACMs, whether the one or more identified vehicles would provide an operational advantage to the autonomous vehicle in the cooperative driving engagement comprises determining whether one or more of the sensors of the one or more identified vehicles would provide a sensor capability not possessed by the autonomous vehicle that would be beneficial for safety or operational performance of the autonomous vehicle.

6. The method of claim 1, wherein determining, based on the determined ACMs, whether the one or more identified vehicles would provide an operational advantage to the autonomous vehicle in the cooperative driving engagement comprises determining whether a level of autonomy of the one or more identified vehicles would enable the autonomous vehicle to operate more safely or with improved performance in the cooperative driving engagement.

7. The method of claim 1, wherein determining, based on the determined ACMs, whether the one or more identified vehicles would provide an operational advantage to the autonomous vehicle in the cooperative driving engagement takes into consideration a driving condition including at least one of:
    a roadway condition;
    a weather condition;
    a type of roadway;
    a level of vehicle traffic on the roadway;
    a speed limit of the roadway;
    a hazard or obstacle along the roadway; or
    a lighting condition.

8. The method of claim 1, wherein the cooperative driving engagement comprises operating the autonomous vehicle in a caravan with the one or more identified vehicles.

9. The method of claim 1, wherein the cooperative driving engagement comprises sending information to and receiving information from the one or more identified vehicles.

10. The method of claim 1, wherein determining the ACM for the identified vehicles comprises generating a vector or matrix of values that collectively identify or predict a level of autonomy or a performance capability of the identified vehicles.

11. A processor for a vehicle, wherein the processor is configured with processor executable instructions to:
    identify vehicles that are within a threshold distance of the vehicle;
    determine an autonomous capability metric (ACM) for each of the identified vehicles;
    determine, based on the determined ACMs, whether one or more identified vehicles would provide an operational advantage to the vehicle in a cooperative driving engagement; and
    initiate the cooperative driving engagement with the one or more identified vehicles in response to determining that the one or more identified vehicles would provide the operational advantage to the vehicle in the cooperative driving engagement, wherein initiating the cooperative driving engagement includes adjusting one or more driving parameters of the autonomous vehicle to position the autonomous vehicle relative to the one or more identified vehicles so as to leverage sensors of each of the one or more identified vehicles.

12. The processor of claim 11, wherein the processor is further configured with processor executable instructions to initiate the cooperative driving engagement with the one or more identified vehicles in response to determining that the one or more identified vehicles would provide the operational advantage to the vehicle in the cooperative driving engagement by:
    determining whether the one or more identified vehicles will be traveling in a same or similar direction as the vehicle for a threshold period of time in response to determining that the one or more identified vehicles would provide the operational advantage to the vehicle in the cooperative driving engagement; and
    initiating the cooperative driving engagement with the one or more identified vehicles in response to determining that the one or more identified vehicles will be traveling in the same or similar direction as the vehicle for the threshold period of time.

13. The processor of claim 12, wherein the processor is further configured with processor executable instructions to determine whether the one or more identified vehicles will be traveling in a same or similar direction as the vehicle for the threshold period of time by:
    communicating with the one or more identified vehicles to determine a destination or planned travel route of the one or more identified vehicles;
    comparing the destination or planned travel route of the one or more identified vehicles to a destination of the vehicle;
    determining a duration that the one or more identified vehicles will be traveling along a route consistent with the destination of the vehicle; and
    comparing the determined duration to the threshold period of time.

14. The processor of claim 11, wherein the processor is further configured with processor executable instructions to initiate the cooperative driving engagement with the one or more identified vehicles further by:
    sending a communication message to the one or more identified vehicles to request that the one or more identified vehicles participate in the cooperative driving engagement;
    receiving a confirmation message indicating the one or more identified vehicles will participate in the cooperative driving engagement;
    establishing direct communication links to the one or more identified vehicles in response to receiving the confirmation message indicating the one or more identified vehicles will participate in the cooperative driving engagement;
    receiving information from the one or more identified vehicles via the direct communication links; and
    adjusting one or more of the driving parameters of the vehicle based on information received from the one or more identified vehicles.

15. The processor of claim 11, wherein the processor is further configured with processor executable instructions to determine, based on the determined ACMs, whether the one or more identified vehicles would provide the operational advantage to the vehicle in the cooperative driving engagement by determining whether one or more of the sensors of the one or more identified vehicles would provide a sensor capability not possessed by the vehicle that would be beneficial for safety or operational performance of the vehicle.

16. The processor of claim 11, wherein the processor is further configured with processor executable instructions to determine, based on the determined ACMs, whether the one or more identified vehicles would provide the operational advantage to the vehicle in the cooperative driving engagement by determining whether a level of autonomy of the one or more identified vehicles would enable the vehicle to operate more safely or with improved performance in the cooperative driving engagement.

17. The processor of claim 11, wherein the processor is further configured with processor executable instructions to determine, based on the determined ACMs, whether the one or more identified vehicles would provide the operational advantage to the vehicle in the cooperative driving engagement by taking into consideration a driving condition that includes at least one of:
    a roadway condition;
    a weather condition;
    a type of roadway;
    a level of vehicle traffic on the roadway;
    a speed limit of the roadway;
    a hazard or obstacle along the roadway; or
    a lighting condition.

18. The processor of claim 11, wherein the cooperative driving engagement comprises operating the vehicle in a caravan with the one or more identified vehicles.

19. The processor of claim 11, wherein the cooperative driving engagement comprises sending information to and receiving information from the one or more identified vehicles.

20. The processor of claim 11, wherein the processor is further configured with processor executable instructions to determine the ACM for the identified vehicles by generating a vector or matrix of values that collectively identify or predict a level of autonomy or a performance capability of the identified vehicles.

21. A non-transitory processor-readable storage medium having stored thereon processor-executable instructions configured to cause a processor to perform operations for controlling an autonomous vehicle, the operations comprising:
    identifying vehicles that are within a threshold distance of the autonomous vehicle;
    determining an autonomous capability metric (ACM) for each of the identified vehicles;
    determining, based on the determined ACMs, whether the one or more identified vehicles would provide an operational advantage to the autonomous vehicle in a cooperative driving engagement; and initiating the cooperative driving engagement with the one or more identified vehicles in response to determining that the one or more identified vehicles would provide an operational advantage to the autonomous vehicle in the cooperative driving engagement, wherein initiating the cooperative driving engagement includes adjusting one or more driving parameters of the autonomous vehicle to position the autonomous vehicle relative to the one or more identified vehicles so as to leverage sensors of each of the one or more identified vehicles.

22. An autonomous vehicle, comprising:
means for identifying vehicles that are within a threshold distance;
means for determining an autonomous capability metric (ACM) for each of the identified vehicles;
means for determining, based on the determined ACMs, whether one or more identified vehicles would provide an operational advantage to the vehicle in a cooperative driving engagement; and
means for initiating the cooperative driving engagement with the one or more identified vehicles in response to determining that the one or more identified vehicles would provide the operational advantage to the autonomous vehicle in the cooperative driving engagement, wherein initiating the cooperative driving engagement includes adjusting one or more driving parameters of the autonomous vehicle to position the autonomous vehicle relative to the one or more identified vehicles so as to leverage sensors of each of the one or more identified vehicles.

23. The autonomous vehicle of claim 22, wherein means for initiating the cooperative driving engagement with the one or more identified vehicles in response to determining that the one or more identified vehicles would provide the operational advantage to the autonomous vehicle in the cooperative driving engagement comprises:
means for determining whether the one or more identified vehicles will be traveling in a same or similar direction as the autonomous vehicle for a threshold period of time in response to determining that the one or more identified vehicles would provide the operational advantage to the autonomous vehicle in the cooperative driving engagement; and
means for initiating the cooperative driving engagement with the one or more identified vehicles in response to determining that the one or more identified vehicles will be traveling in the same or similar direction as the autonomous vehicle for the threshold period of time.

24. The autonomous vehicle of claim 23, wherein means for determining whether the one or more identified vehicles will be traveling in the same or similar direction as the autonomous vehicle for the threshold period of time comprises:
means for communicating with the one or more identified vehicles to determine a destination or planned travel route of the one or more identified vehicles;
means for comparing the destination or planned travel route of the one or more identified vehicles to a destination of the autonomous vehicle;
means for determining a duration that the one or more identified vehicles will be traveling along a route consistent with the destination of the autonomous vehicle; and
means for comparing the determined duration to the threshold period of time.

25. The autonomous vehicle of claim 22, wherein means for initiating the cooperative driving engagement with the one or more identified vehicles further comprises:
means for sending a communication message to the one or more identified vehicles to request that the one or more identified vehicles participate in the cooperative driving engagement;
means for receiving a confirmation message indicating the one or more identified vehicles will participate in the cooperative driving engagement;
means for establishing direct communication links to the one or more identified vehicles in response to receiving the confirmation message indicating the one or more identified vehicles will participate in the cooperative driving engagement;
means for receiving information from the one or more identified vehicles via the direct communication links; and
means for adjusting one or more of the driving parameters of the autonomous vehicle based on information received from the one or more identified vehicles.

26. The autonomous vehicle of claim 22, wherein means for determining, based on the determined ACMs, whether the one or more identified vehicles would provide an operational advantage to the autonomous vehicle in the cooperative driving engagement comprises means for determining whether one or more of the sensors of the one or more identified vehicles would provide a sensor capability not possessed by the autonomous vehicle that would be beneficial for safety or operational performance of the autonomous vehicle.

27. The autonomous vehicle of claim 22, wherein means for determining, based on the determined ACMs, whether the one or more identified vehicles would provide an operational advantage to the autonomous vehicle in the cooperative driving engagement comprises means for determining whether a level of autonomy of the one or more identified vehicles would enable the autonomous vehicle to operate more safely or with improved performance in the cooperative driving engagement.

28. The autonomous vehicle of claim 22, wherein means for determining, based on the determined ACMs, whether the one or more identified vehicles would provide an operational advantage to the autonomous vehicle in the cooperative driving engagement takes into consideration a driving condition including at least one of:
a roadway condition;
a weather condition;
a type of roadway;
a level of vehicle traffic on the roadway;
a speed limit of the roadway;
a hazard or obstacle along the roadway; or
a lighting condition.

29. The autonomous vehicle of claim 22, wherein means for determining the ACM for the identified vehicles comprises means for generating a vector or matrix of values that collectively identify or predict a level of autonomy or a performance capability of the identified vehicles.

* * * * *